United States Patent
Yabuki et al.

(10) Patent No.: US 6,737,192 B2
(45) Date of Patent: May 18, 2004

(54) TERMINAL STRUCTURE OF STORAGE BATTERY

(75) Inventors: Shuichi Yabuki, Fukushima (JP); Keitaro Wada, Fukushima (JP); Kenji Nakano, Fukushima (JP); Ichiro Sano, Tokyo (JP)

(73) Assignee: The Furukawa Battery Co., Ltd., Yokohama (JP)

( * ) Notice: Subject to any disclaimer, the term of this patent is extended or adjusted under 35 U.S.C. 154(b) by 144 days.

(21) Appl. No.: 10/076,485

(22) Filed: Feb. 19, 2002

(65) Prior Publication Data

US 2002/0114994 A1 Aug. 22, 2002

(30) Foreign Application Priority Data

Feb. 21, 2001 (JP) ........................................ 2001-045093
Oct. 22, 2001 (JP) ........................................ 2001-323460
Oct. 31, 2001 (JP) ........................................ 2001-333705

(51) Int. Cl.$^7$ ................................................ H01M 2/02
(52) U.S. Cl. .......................... 429/178; 429/175; 429/176
(58) Field of Search ........................ 429/175, 176, 429/178

(56) References Cited

FOREIGN PATENT DOCUMENTS

JP 9-213302 * 8/1997 ............ H01M/2/30

OTHER PUBLICATIONS

Japanese Patent Laid–Open No. 320718/1995, Dec. 8, 1995 (cited on page 1 of the specification) *Abstract*.

Japanese Patent Laid–Open No. 213302/1997, Aug. 8, 1997 (cited on page 1 of the specification) *Abstract*.

* cited by examiner

Primary Examiner—Patrick Ryan
Assistant Examiner—Dah-Wei Yuan
(74) Attorney, Agent, or Firm—Armstrong, Kratz, Quintos, Hanson & Brooks, LLP

(57) ABSTRACT

A terminal structure for a storage battery in which a plate terminal 1 includes one end plate portion 1*a* connected to the electrode pole H of the storage battery, and a led-out plate portion 1*b* led out from the electrode pole H to a notch D of a cover C. The led-out plate portion 1*b* is formed into a horizontal plate portion 1*b*1 having a bolt insertion hole 3, and a vertical plate portion 1*b*2 vertically bent downwards into an L-shape and having a bolt insertion hole 4; and the plate terminal 1 is mounted on a cover face d1 by the vertical plate portion 1*b*2; characterized in that a lower-plate portion 6 of the vertical plate portion 1*b*2 is provided with engagement portions 7, 7 and is pressed into a snug fit hole 8 provided in the cover C, so as to fix the respective engagement portions 7, 7 in engagement with opposing inner wall faces 8*a*, 8*b*.

19 Claims, 39 Drawing Sheets

(a)

(b)

(c)

(d)

TERMINAL STRUCTURE OF STORAGE BATTERY

BACKGROUND OF THE INVENTION

1. Field of the Invention

The present invention relates to the terminal structure of a storage battery for use in a sealed lead-acid battery for a motor bicycle, etc.

2. Description of Related Art

The terminal structures of storage batteries in the prior art have been known from, for example, the official gazettes of Japanese Patents Laid-Open No. 320718/1995 and No. 213302/1997. Disclosed in the former is an invention concerning the terminal structure of a lead acid battery wherein, in a notch which is formed at a corner of a cover substantially in the shape of a rectangular parallelepiped, a led-out plate portion in which one end of which is drawn out of an electrode pole is bent into an L-shape downwards, a horizontal plate portion and a vertical plate portion of the L-shaped led-out plate portion are respectively spliced to a top face and a front side face of a terminal supporter which protrudes from a bottom face of the notch, the L-shaped led-out plate portion is provided with bolt insertion holes at its positions corresponding to nut insertion grooves which are respectively formed in the top face and the front side face, a lower end of the vertical plate portion is inserted into a recessed portion which is provided in the bottom face of the notch, an L-shaped cut is provided by the side of the bolt insertion hole of the vertical plate portion, and the corresponding side edge of the vertical plate portion is bent inwards to form a stopper which stops the engagement with an upper edge of the nut insertion groove formed in the front side face, whereby the lower end of a plate terminal is prevented from coming out of the recessed portion, and the plate terminal is prevented from moving upwards and from deforming when it is bolted up.

Disclosed in the latter is an invention concerning the terminal structure of a lead acid battery wherein, in a notch which is formed at a corner of a cover substantially in the shape of a rectangular parallelepiped, a led-out plate portion in which one end of which is drawn out of an electrode pole is bent into a U-shape downwards on one end side thereof, so as to define a concave space on the resulting U-shaped portion and is bent into a U-shape upwards on an outer end side thereof, so as to define a backside space of the resulting U-shaped crooked plate portion as a nut accommodation space. Bolt insertion holes are respectively provided in a horizontal plate portion and a vertical plate portion of the U-shaped crooked plate portion, a horizontal lower plate portion which is formed by bending a lower plate portion of the vertical plate portion at a right angle inwards is snugly fit into a groove which is provided in a terminal supporter protruded from a bottom face of the notch, and a stopper portion is provided on at least one side of the groove, whereby the plate terminal is prevented from being easily deformed by a torque which is applied during bolting of the plate terminal.

In the former invention, the L-shaped cut is provided by the side of the bolt insertion hole formed in the vertical plate portion of the plate terminal, and the corresponding side edge of the vertical plate portion is bent to form the stopper which stops in engagement with the upper edge of the nut insertion groove. Therefore, the part of the vertical plate portion corresponding to the position of the bolt insertion hole becomes narrow and increases resistance to a current flowing through the plate portion. This incurs the drawback of a decrease in current which is derived to external lead wire connected to the bolt insertion hole by tightening a bolt and a nut. On the other hand, the stopper engages only the upper edge of the nut insertion groove and cannot reliably prevent the plate terminal from moving upwards and downwards.

Besides, in order to insert the lower end of the vertical plate portion of the plate terminal into the recessed portion of the notch and simultaneously to bring the stopper into engagement with the upper edge of the nut insertion groove provided on the cover side, the positional relationship between the stopper and the nut insertion groove of the cover side needs to be always constant. In mass production, however, the positional relationship is not always constant, and the stopper and the nut insertion groove sometimes involve a positional deviation therebetween. In some cases, accordingly, the stopper does not properly engage the upper edge of the nut insertion groove, so that the plate terminal cannot be assembled to the cover causing a manufactural loss.

In the latter invention, merely the horizontal lower plate portion of the vertical plate portion of the plate terminal is snugly fit into the groove of the terminal supporter. Therefore, the horizontal lower plate portion of the vertical plate portion might come out of the groove due to a very large torque which is applied when a bolt is inserted through the bolt insertion hole and is tightened.

SUMMARY OF THE INVENTION

The present invention eliminates the drawbacks of the prior art, and provides the terminal structure of a storage battery which is stably and rigidly mounted on a cover with ease and at high reliability. The present invention is easy of manufacture and involves no manufactural loss, which reliably prevents a plate terminal from twisting or deforming similarly on account of a torque produced in a bolting operation, and which can increase an externally derivable current. Concretely, a terminal structure of a storage battery wherein a plate terminal whose one end plate portion is connected to an electrode pole of the storage battery, and whose led-out plate portion led out from the electrode pole to a notch formed in a cover of the storage battery is formed into an L-shaped led-out plate portion vertically bent downwards and is provided with a bolt insertion hole, is mounted on a cover face. This terminal structure is characterized in that a lower plate portion of the vertical plate portion of the plate terminal is provided with at least one engagement portion, and that the lower plate portion of the plate terminal is pressed into a snug fit hole provided in the cover face, so as to fix the engagement portion in engagement with an opposing face of the snug fit hole. Herein, the engagement portion is formed of at least one member selected from the group consisting of convex parts, concave parts and a through hole in a desired shape.

In this manner, according to the present invention, the terminal structure is so constructed that the lower plate portion of the plate terminal is provided with an engagement portion, and that the lower plate portion is pressed into the snug fit hole provided in the face of the cover, so as to fix the engagement portion in engagement with the snug fit hole. Therefore, the plate terminal is reliably prevented from turning laterally, deforming or coming off upwards, due to the torque produced in the bolting operation, and the stable and stout terminal structure is obtained, merely by pressedly inserting the lower plate portion into the recessed snug fit hole which is provided in the bottom face of the notch formed at the corner of the cover of a storage battery body. Accordingly, the assembling operation of the terminal structure is easier and quicker than in the case of prior-art where a terminal structure is assembled by fixing the stopper of a plate terminal in engagement with a nut insertion groove, and where a storage battery including the terminal structure is manufactured. Also, the storage battery including the terminal structure of the present invention is obtained without any manufactural loss at an efficiency higher than in the prior-art case. Another advantage of the terminal structure of the present invention is that the terminal plate can derive a larger current to an external terminal than the prior-art plate terminal.

DESCRIPTION OF THE PREFERRED EMBODIMENTS

Now, embodiments of the present invention will be described in detail with reference to the accompanying drawings.

FIG. 1 through FIG. 5 show one embodiment of the present invention. The embodiment is provided at reference a1, a1 has terminal structures of the present invention in which plate terminals 1 connected to the upper end parts of the positive and negative electrode poles of a storage battery body, for example, the body of a sealed lead-acid battery for a motor bicycle are respectively mounted. More specifically, the lead-acid battery body A is constructed by a conventional method in such a manner that a cover C in the shape of a square box is airtightly bound by heat seal or the like onto the top face of a battery jar B in which cells connected in series are accommodated. The cover C is such that respective lead bushings E are previously molded by casting at positions adjacent to notches D, D each of which is substantially in the shape of a rectangular parallelepiped, and which are formed at the right and left corners C1, C1 of one side of the storage battery body A. Positive and negative electrode pole terminals are respectively formed by a conventional method in such a way that the positive and negative electrode poles H, which are respectively erect from straps G for the positive and negative electrode terminals of the cells F accommodated in the right and left cell chambers of the battery jar B are inserted through the electrode pole insertion holes of the lead bushings E, and that the upper end parts of the electrode poles H protrude out of the cover C and are welded to the surrounding lead bushings E by a burner or the like. In the welding operation, each of the plate terminals 1 in the present invention has its one end plate portion 1$a$ welded to the corresponding lead bushing E and is led out onto the side of the corresponding notch D. The led-out plate portion 1$b$ of the plate terminal 1 is mounted on the bottom face d1 of the notch D as will be detailed later. Thus, the lead-acid battery is constructed in which the terminal structures a1, a1 of positive and negative electrodes in the present invention are respectively included at the right and left corners C1, C1 of one side of the storage battery body A.

Here in the embodiment shown in FIG. 1–FIG. 5, the right and left terminal structures a1, a1 are respectively disposed at the right and left corners C1, C1 of the cover C of the storage battery in the present invention and have the same constructions. Therefore, as follows, one terminal structure a1 in the embodiment shall be described in detail.

Figure 1:
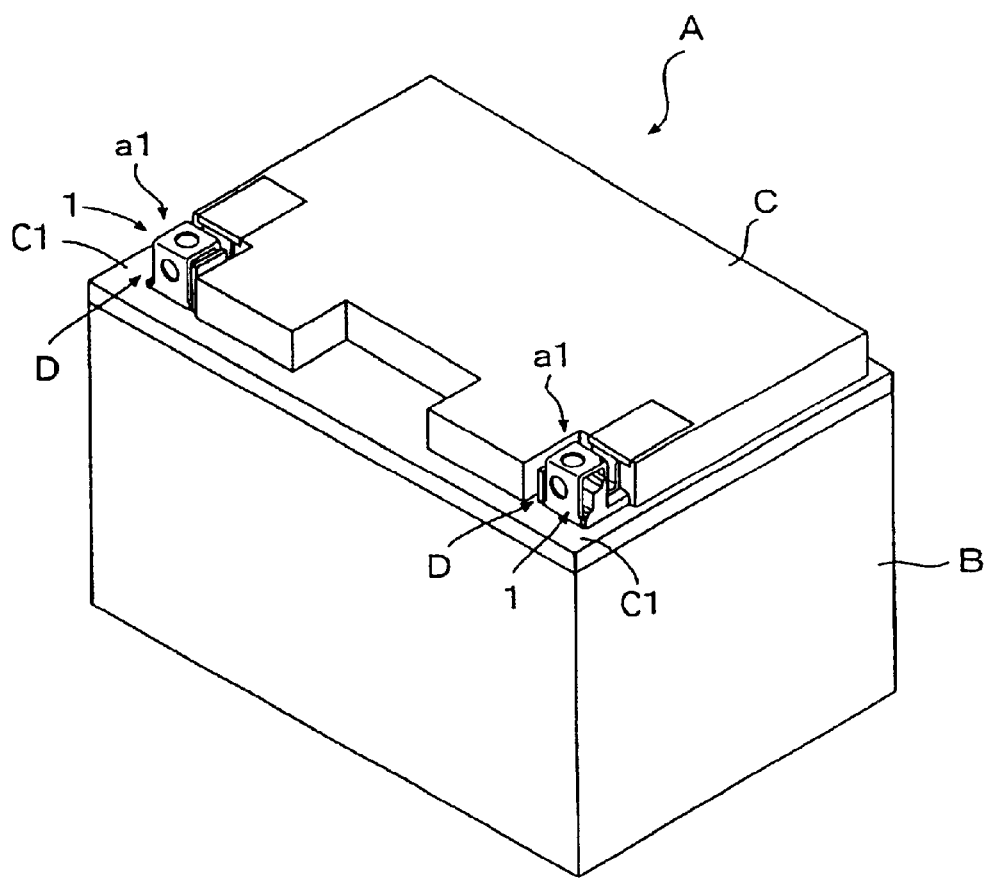
FIG. 1 is a perspective view of a storage battery which includes positive and negative electrode terminal structures in one embodiment of the present invention.

In the embodiment shown in FIG. 1–FIG. 5, FIG. 2 shows an exploded perspective view of the terminal structure a1 of the present invention shown in FIG. 1. The plate terminal 1 in the present invention is formed of an elongate rectangular metal plate of good conductivity, which is thin, tough and elastic and is about 2–2.5 mm thick, and which is made of, for example, brass. One end plate portion 1$a$ of the plate terminal 1 is formed with a circular hole 2 which is adapted to be snugly fit on the lead bushing E. When the end plate portion 1$a$ is snugly fit on the lead bushing E, the led-out plate portion 1$b$ led out to the notch D of the cover C is made an L-shaped one 1$b$ whose distal end side is vertically bent downwards. The horizontal plate portion 1$b$1 and vertical plate portion 1$b$2 of the led-out plate portion 1$b$ are respectively provided with bolt insertion holes 3 and 4. Nut accommodation spaces 5, 5 are respectively defined on the backsides of the horizontal plate portion 1$b$1 and vertical plate portion 1$b$2. Although the above construction does not differ from the construction of a plate terminal in the prior art, the plate terminal 1 in the present invention is provided with engagement portions at both the side edges of the lower plate portion 6 of the vertical plate portion 1$b$2. By way of example, unidirectional teeth or corrugations 7, 7 like arrowheads or saw teeth are formed as the engagement portions. The lower plate portion 6 having the teeth 7, 7 is pressed into a snug fit hole 8 in a recessed groove shape, which is formed in the bottom face d1 of the notch D at the corner C1 of the cover C and which is equal in thickness and width to the lower plate portion 6 and is deep enough to merge the full length of the teeth 7, 7. The press-in operation is performed while the upper face of the horizontal plate portion 1$b$1 is being hit with a hammer or the like, and until the teeth 7, 7 at both the side edges are fixed in engagement with the opposing inner wall faces 8$a$, 8$b$ of the snug fit hole 8. In this way, the terminal structure a1 of the storage battery according to the present invention is constructed.

Figure 4:
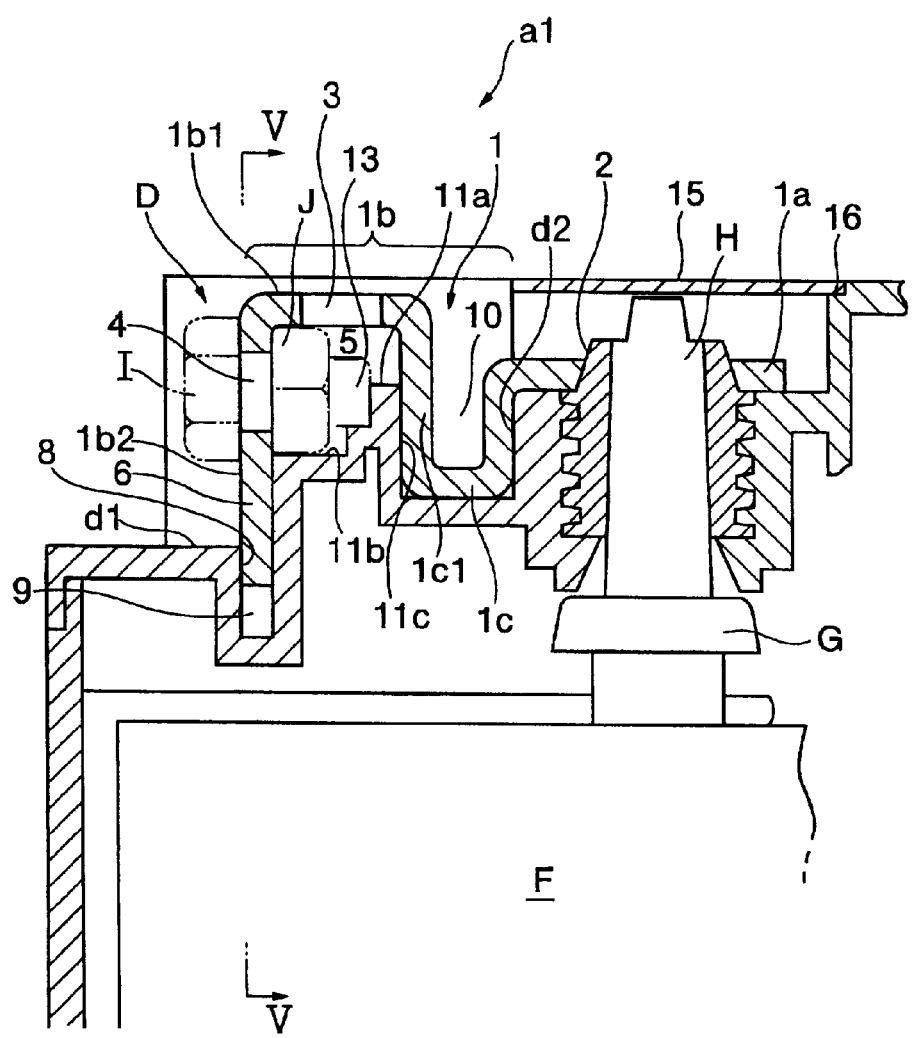
FIG. 4 is a sectional view taken along line IV—IV in FIG. 3.

By the way, as clearly shown in FIG. 4, a space which is adapted to insert a hexagon nut J with the opposing side faces of the nut oriented at the top and bottom of the space should preferably be defined between the nut receiving face 11$b$ of a supporter protrusion 11 and the back face of the horizontal plate portion 1$b$1 of the plate terminal 1. Thus, the catch of the nut J, during bolting, can be favorably prevented.

In this manner, according to the terminal structure a1 of the present invention, the plate terminal 1 has the lower plate portion 6 of its vertical plate portion 1$b$2 pressedly and snugly secured in the snug fit hole 8 in the top face of the cover C. Therefore, in a case where an external lead terminal (not shown) is clamped and bound to the plate terminal 1 by a bolt and a nut, the bolt I is inserted through the bolt insertion hole 3 provided in the horizontal plate portion 1$b$1 of the plate terminal 1 or the bolt insertion hole 4 provided in the vertical plate portion 1$b$2 thereof, and it is screwed into the nut J inserted in the corresponding nut accommodation space 5 on the backside of the horizontal or vertical plate portion. Even when the plate terminal 1 undergoes a large torque arising on occasion, it is reliably prevented from turning in a horizontal direction, twisting, deforming, etc., and it is prevented from coming off upwards by the fixation of the teeth 7, 7 at both the side edges of the lower plate portion 6 in engagement with the opposing inner wall faces 8$a$, 8$b$. Thus, the terminal structure a1 in which the plate terminal 1 is attached to the cover C very stably and rigidly is obtained. Moreover, the plate terminal a1 is thereafter stable from vertical vibrations.

Incidentally, a notched opening 9 which is in the shape of, for example, a circular arc open to the lower end of the lower plate portion 6 should preferably be provided centrally of the lower end edge of this plate terminal 1. Thus, when the lower plate portion 6 of the plate terminal 1 is pressed into the snug fit hole 8, both the side edges of the lower plate portion 6 of the thin plate terminal 1 are brought very slightly near the side of the notched opening 9, and hence, the press-in operation can be performed easily and smoothly.

Figure 5:
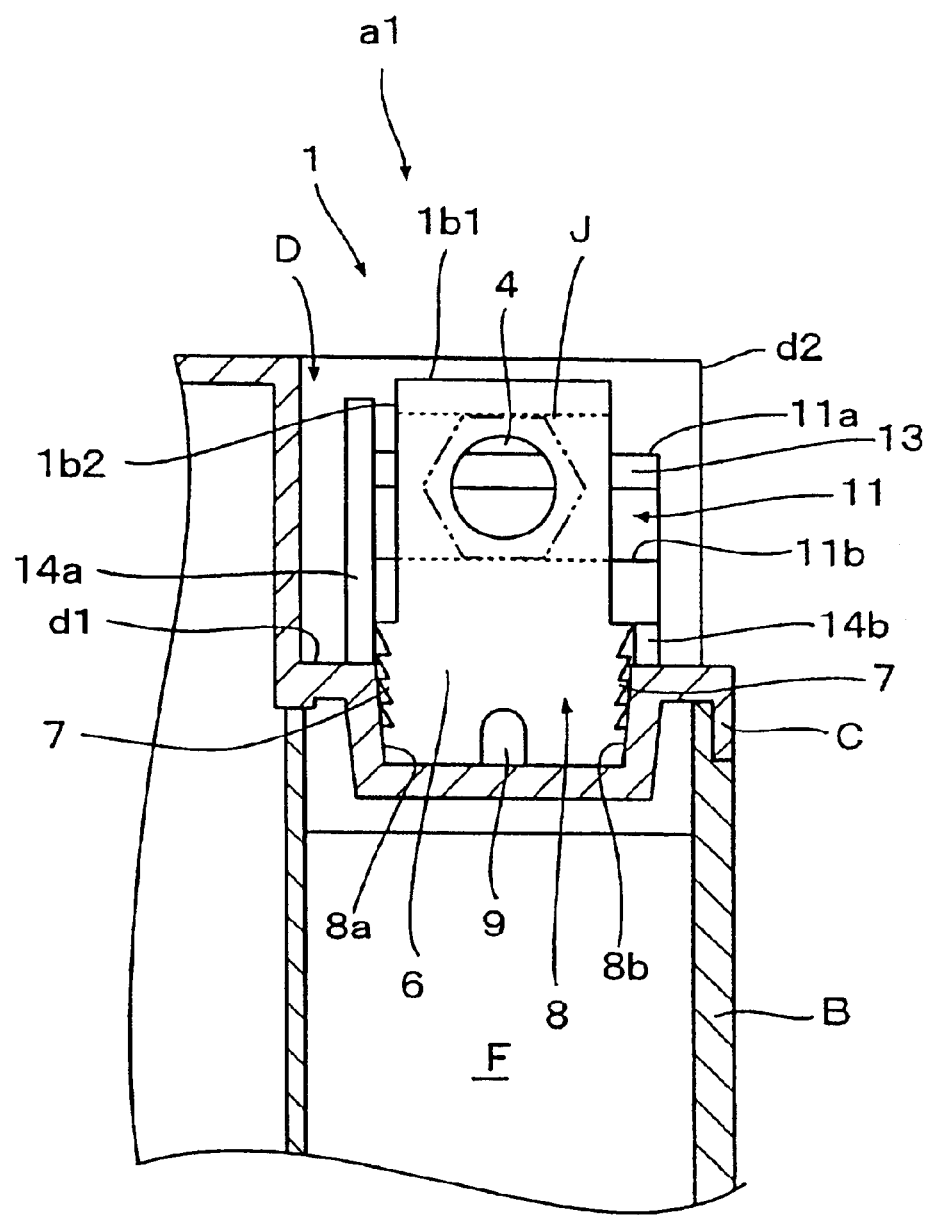
FIG. 5 is a sectional view taken along line V—V in FIG. 4.

Besides, in a case as shown in FIG. 5 where the width of the snug fit hole 8 is formed having a taper so as to slightly and gradually widen toward the upper end thereof and where the width of that part of the lower plate portion 6 of the vertical plate portion 1$b$2 of the plate terminal 1 which is pressed into the snug fit hole 8 is formed so as to gradually narrow toward the lower end thereof, favorably the operation of pressing the lower plate portion 6 of the plate terminal 1 into the snug fit hole 8 is smoothly performed.

Figure 2:
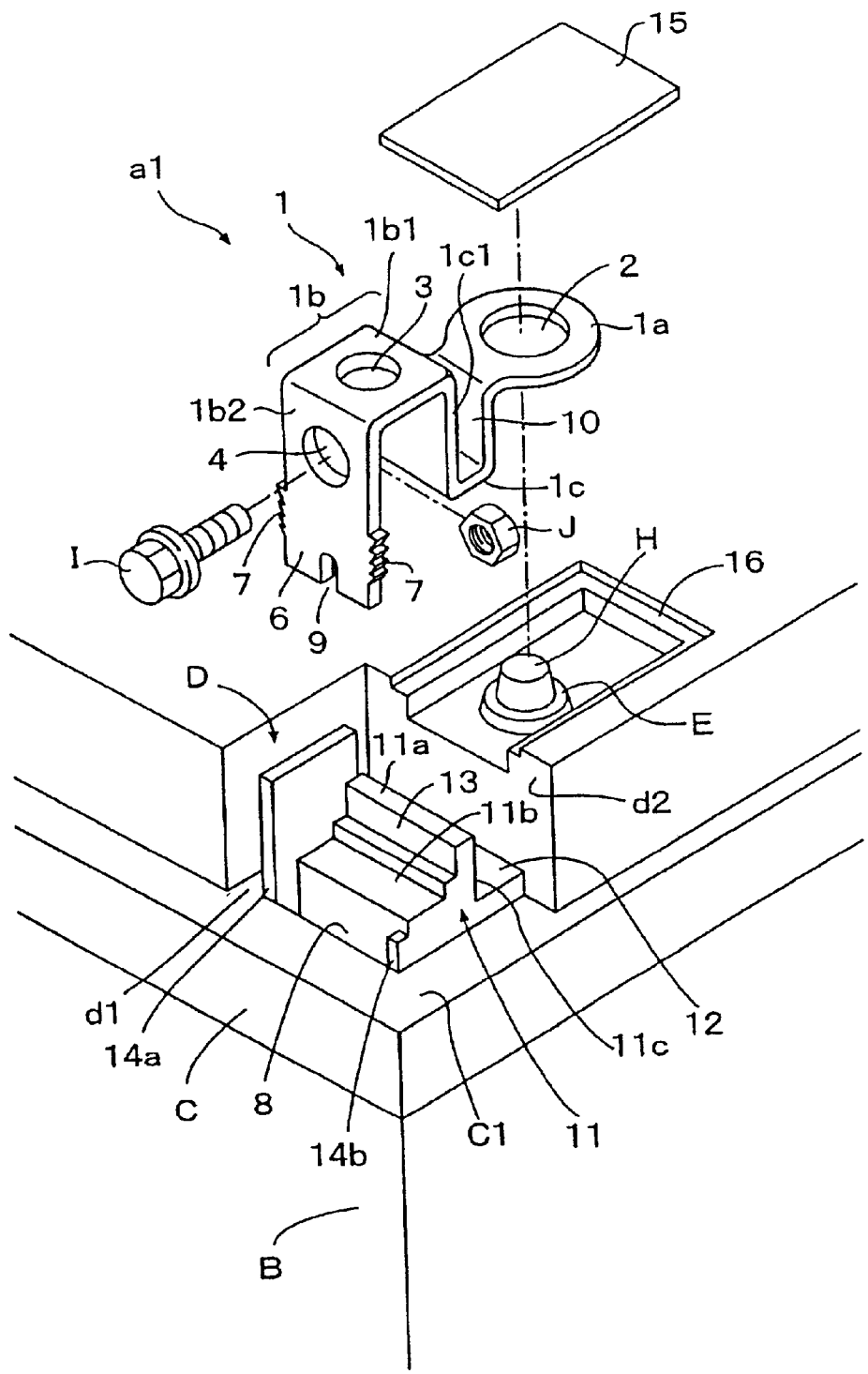
FIG. 2 is an exploded perspective view of the terminal structure of one electrode pole in FIG. 1.
Figure 3:
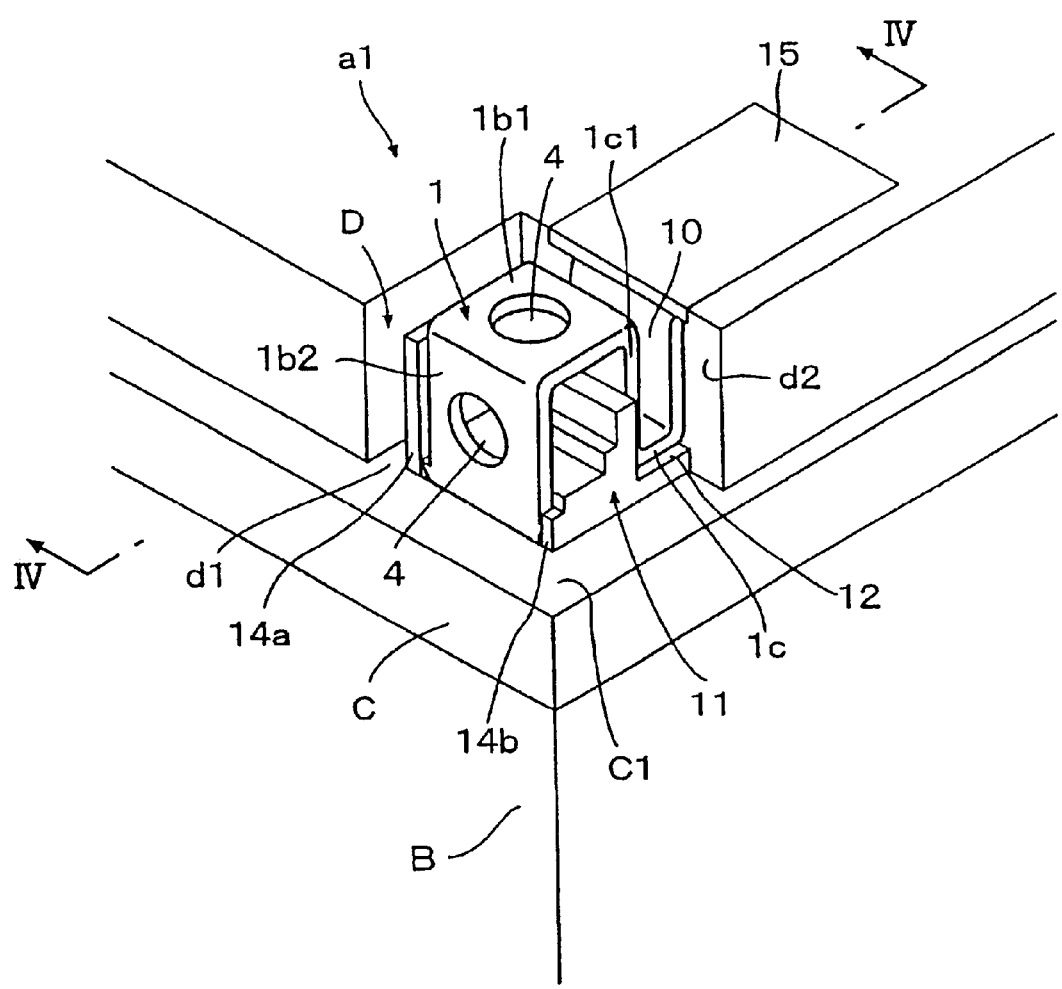
FIG. 3 is an assembled perspective view of the terminal structure in FIG. 2.

Besides, if desired, the plate terminal 1 may well be formed as best shown in FIG. 4 so that its part adjoining the end plate portion 1$a$ behind the horizontal plate portion 1$b$1 is crooked in a U-shape downwards direction, into a downward U-shaped crooked plate portion 1$c$, and that a U-shaped concave space 10 whose upper face is open and in which the anode terminal cover of a motor bicycle can be inserted is defined on the outer face of the crooked plate portion 1$c$. In correspondence with such a structure, the notch D is formed with an accommodation space 12 as best shown in FIG. 2, which is defined between a vertical wall face 1$c$ being the rear face of the supporter protrusion 11 protruding from the bottom face d1 and having its upper and front faces formed into nut receiving faces 11$a$, 11$b$, and a vertical wall face d2 opposing to the vertical wall face 11$c$ and being nearer to the electrode pole H, and which has a width adapted to snugly insert the downward U-shaped crooked plate portion 1c. Thus, the downward U-shaped crooked plate portion 1c can be snugly secured into the accommodation space 12. Incidentally, a recessed portion 13 in which the distal end part of the bolt I to be threadably inserted from above or from the front is accommodated and should preferably be formed at the intermediate part of the supporter protrusion 11.

In the drawings, reference signs 14a, 14b designate guide walls which guide the lower plate portion 6 of the vertical plate portion 1b2 of the plate terminal 1 when it is pressed into the snug fit hole 8. Reference numeral 15 designates a cover plate which is bound by heat seal to a snug fit groove 16 surrounding the upper end part of the electrode pole H.

FIG. 6 through FIG. 10 show the terminal structure a2 of a storage battery in another embodiment of the present invention as an alternative to the foregoing embodiment. In these figures, the same constituent members as in the foregoing embodiment are indicated by the same numerals and signs.

Figure 6:
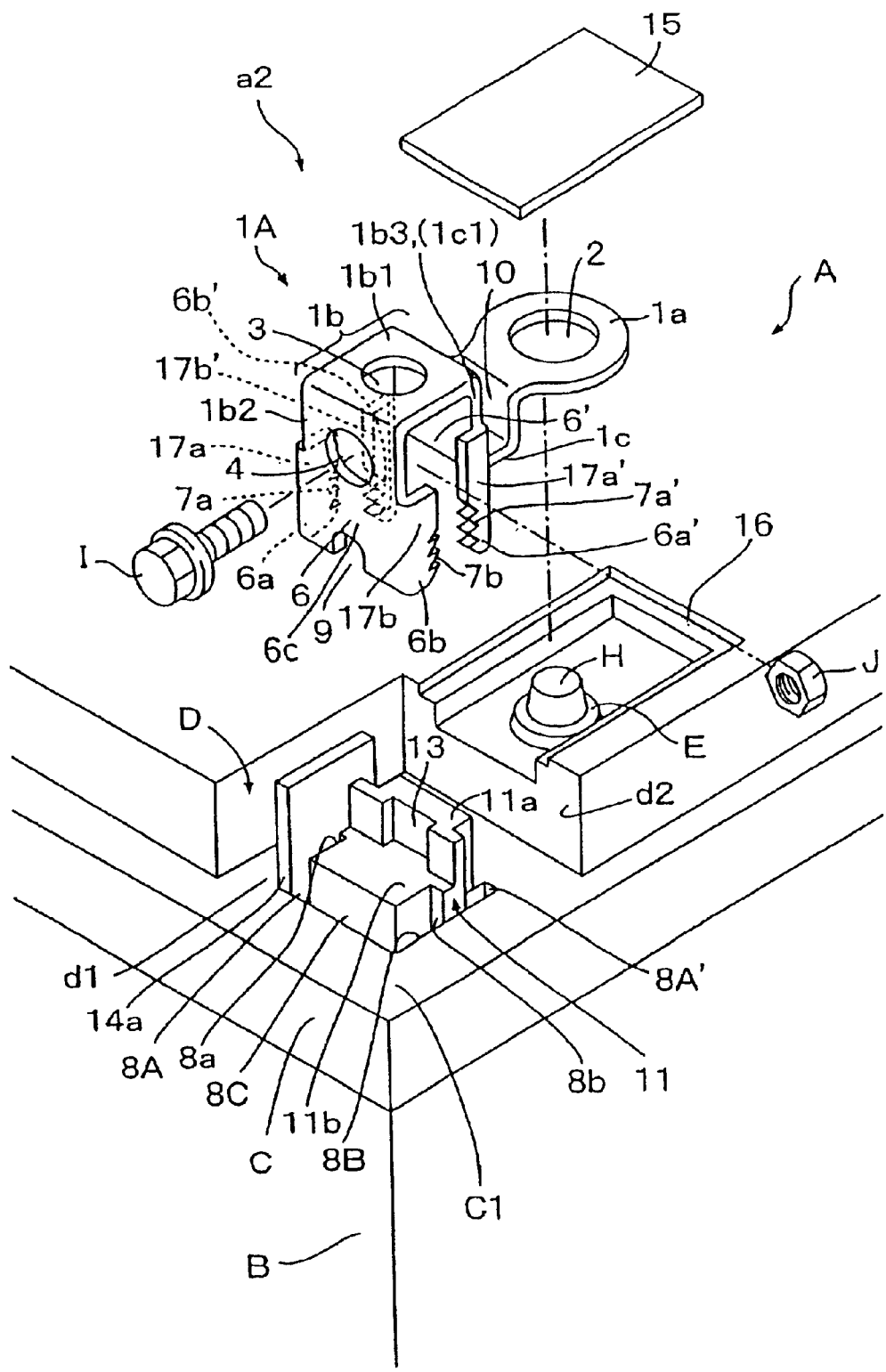
FIG. 6 is an exploded perspective view of a terminal structure in one polarity of a storage battery in another embodiment of the present invention, similar to FIG. 2 showing the first embodiment.
Figure 7:
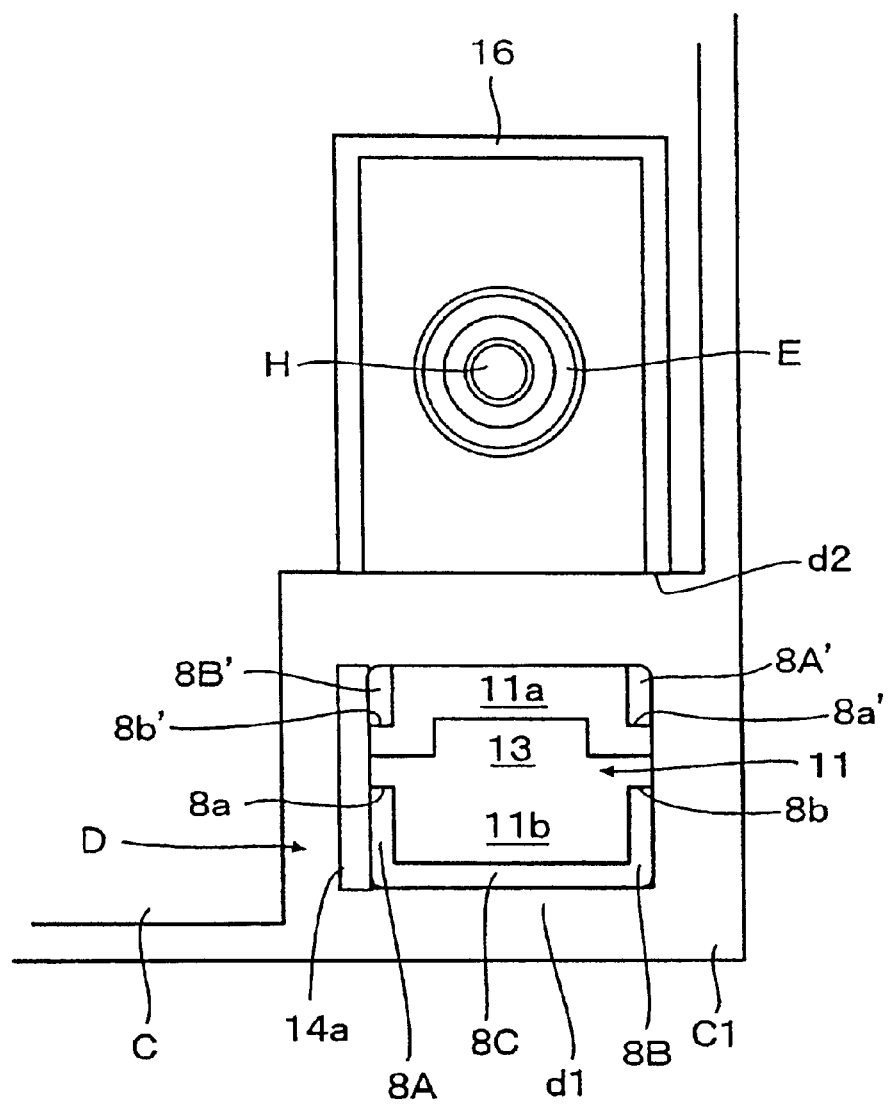
FIG. 7 is a top plan view of the corner of a cover in FIG. 6.
Figure 8:
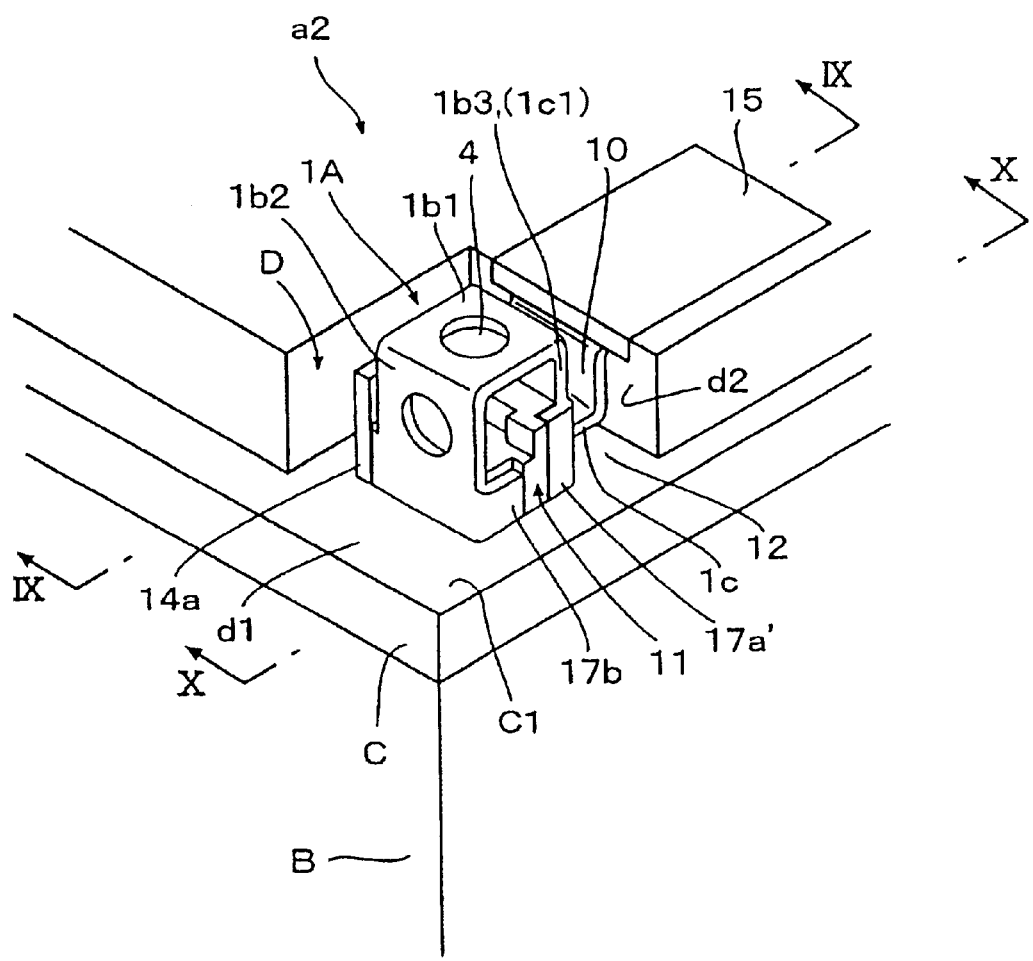
FIG. 8 is an assembled perspective view of the terminal structure in FIG. 6.
Figure 9:
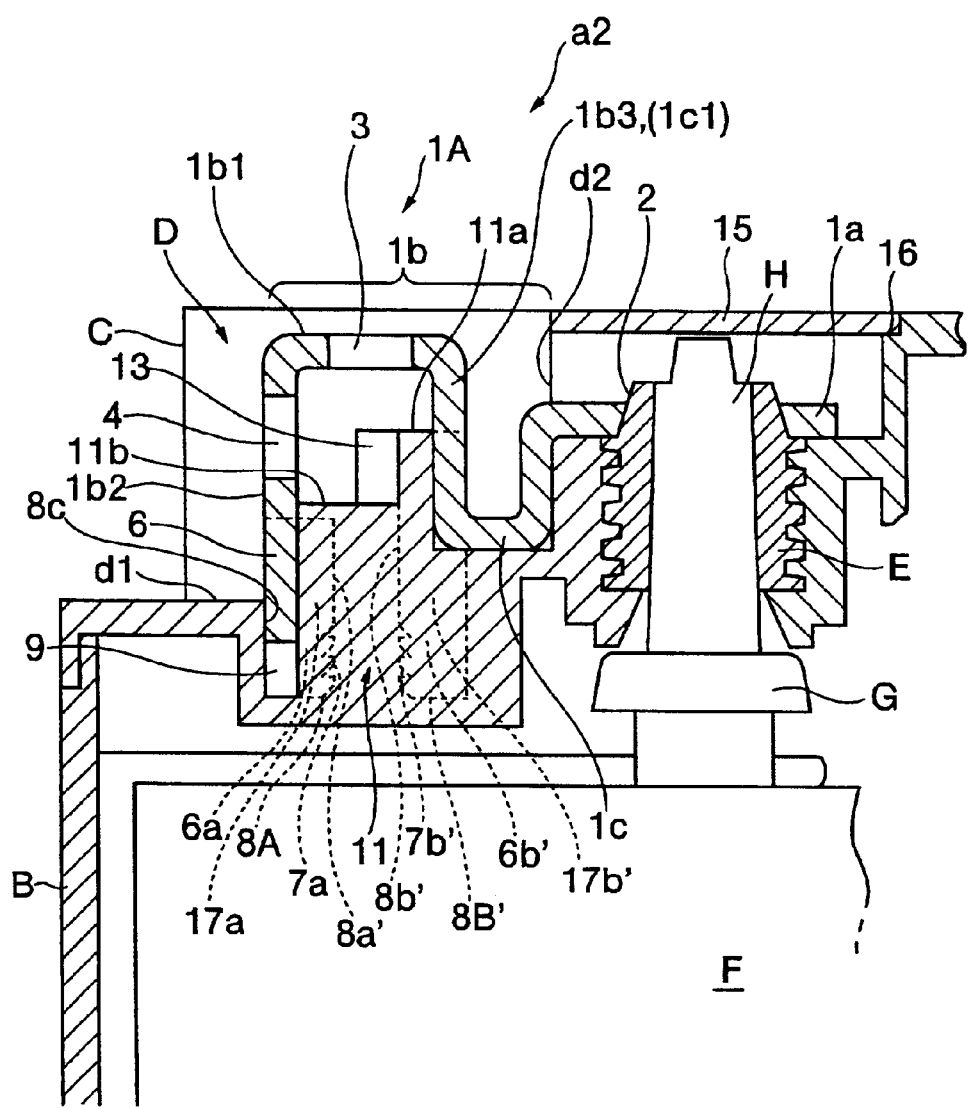
FIG. 9 is a sectional view taken along line IX—IX in FIG. 8.
Figure 10:
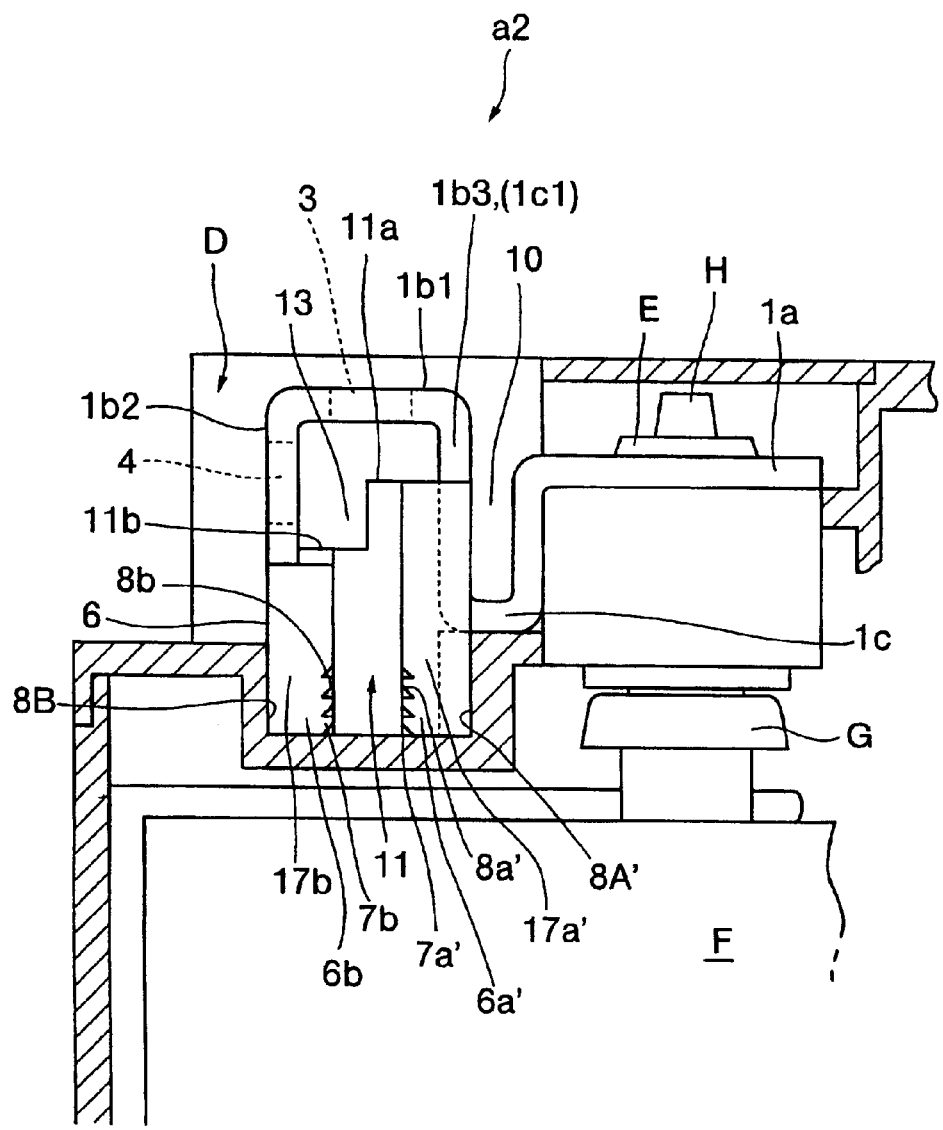
FIG. 10 is a sectional view taken along line X—X in FIG. 8.
Figure 11:
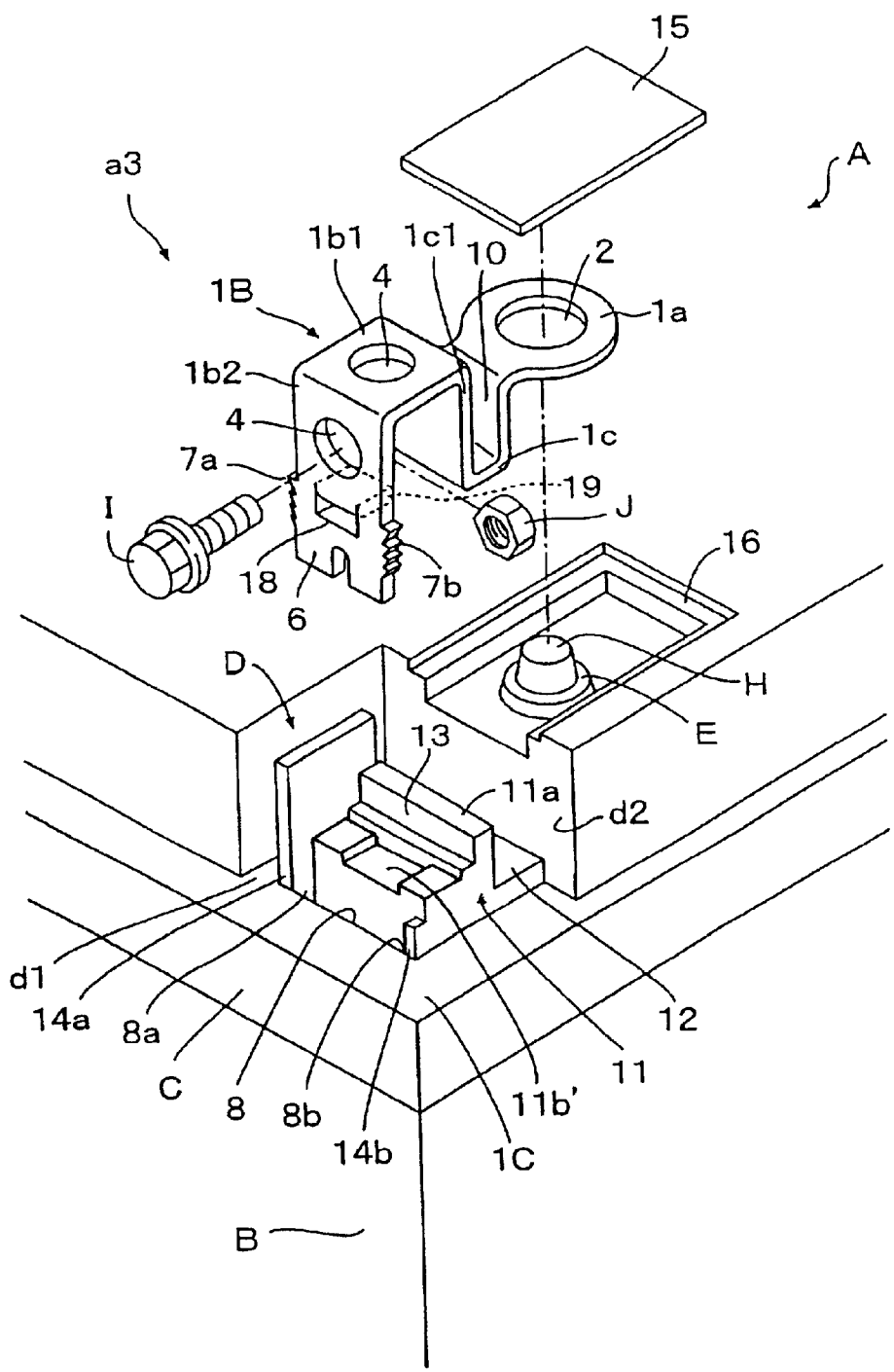
FIG. 11 is an exploded perspective view of a terminal structure in one polarity of a storage battery in still another embodiment of the present invention, similar to FIG. 2 showing the first embodiment.
Figure 12:
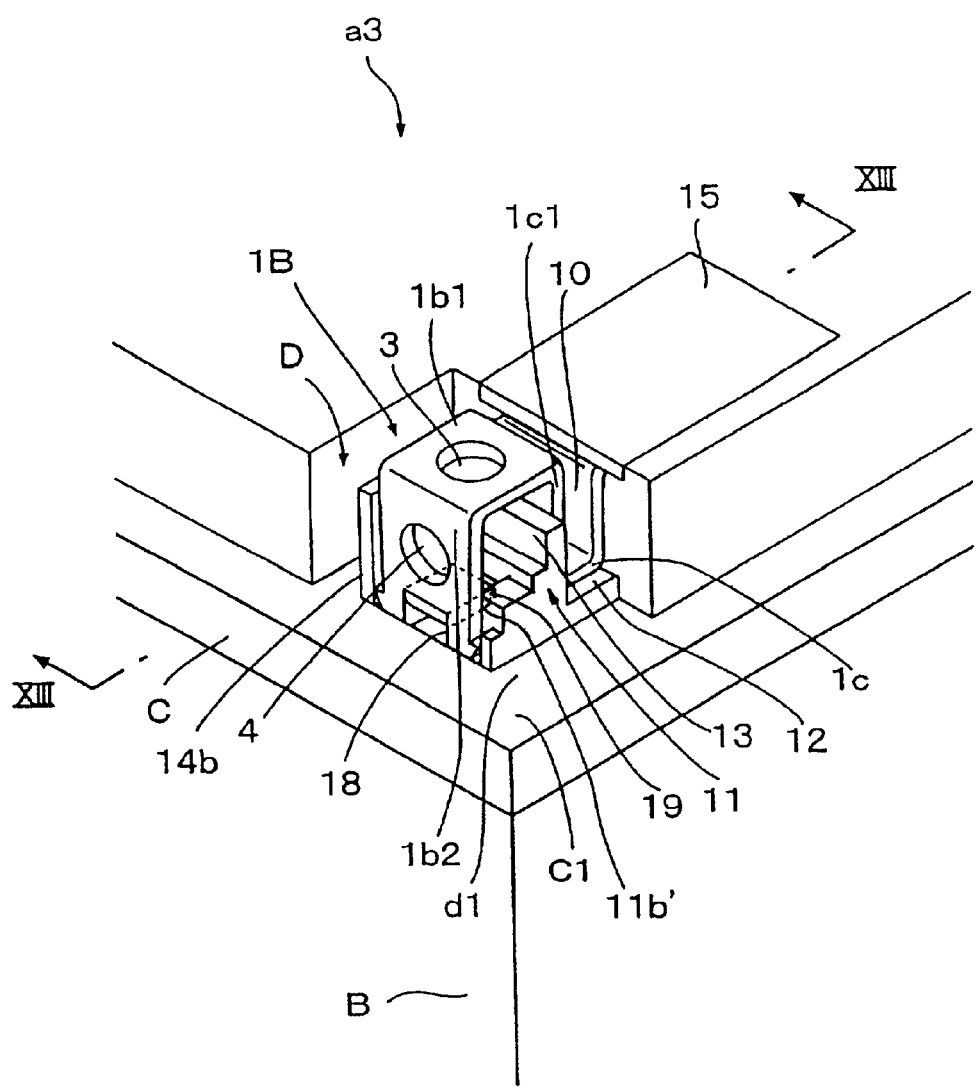
FIG. 12 is an assembled perspective view of the terminal structure in FIG. 11.

FIG. 6 shows an exploded perspective view of the terminal structure a2 of the storage battery, corresponding to the exploded perspective view of the terminal structure of the foregoing embodiment as shown in FIG. 2. The terminal structure a2 has a construction as stated below.

A plate terminal 1A is formed with bent plate portions 17a, 17b each of which is bent into an L-shape rearwards, as engagement portions at both the side edges of the lower plate portion 6 of the vertical plate portion 1b2 of the plate terminal 1A. Also, an additional vertical plate portion 1b3 is provided at a position confronting the vertical plate portion 1b2 in parallel therewith and behind it, by vertically bending the rear part of the horizontal plate portion 1b1 of the plate terminal 1A downwards. In the illustrated example, the vertical plate portion 1c1 of the same downward U-shaped crooked plate portion 1c as formed in the first embodiment is replaced with the additional vertical plate portion 1b3, both the side edges of which are respectively formed as engagement portions with bent plate portions 17a', 17b', each of which is bent into an L-shape frontwards. Herein, teeth or corrugations 7a, 7b are provided at the rear end side edges of the lower plate portions 6a, 6b of the respective bent plate portions 17a, 17b protruding rearwards from both the sides of the lower plate portion 6 of the front vertical plate portion 1b2, while teeth or corrugations 7a', 7b' are provided at the front end side edges of the lower plate portions 6a', 6b' of the right and left bent plate portions 17a', 17b' protruding frontwards from both the sides of the lower plate portion 6' of the rear vertical plate portion 1b3. Thus, the plate terminal 1A is constructed. On the other hand, regarding the side of the cover C of a storage battery body A, as clearly shown in FIG. 7, the bottom face d1 of the notch D of the body A is formed with recessed snug fit holes 8A, 8B which are respectively adapted to pressedly insert the lower plate portions 6a, 6b of the bent plate portions 17a, 17b disposed at the right and left of the front vertical plate portion 1b2, while it is formed with recessed snug fit holes 8A', 8B' which are respectively adapted to pressedly insert the lower plate portions 6a', 6b' of the bent plate portions 17a', 17b' disposed at the right and left of the rear vertical plate portion 1b3. The lower plate portions 6a, 6b of the right and left bent plate portions 17a, 17b of the front vertical plate portion 1b2 of the above plate terminal 1A, and the lower plate portions 6a', 6b' of the right and left bent plate portions 17a', 17b' of the rear vertical plate portion 1b3 are respectively pressed into the right and left snug fit holes 8A, 8B and the right and left snug fit holes 8A', 8B' which are located at the front and the rear corresponding with these lower plate portions. The press-in operation is performed until the teeth 7a, 7b and 7a', 7b' of the lower plate portions 6a, 6b and 6a', 6b' are respectively fixed in engagement with the opposing inner wall faces 8a, 8b and 8a', 8b' of the snug fit holes 8A, 8B and 8A', 8B'. Thus, the terminal structure a2 is constructed.

In this manner, the plate terminal 1A is formed into a generally tetrahedral frame which has the L-shaped bent plate portions 17a, 17b, 17a', 17b' at the right and left of the lower parts of the front and rear vertical plate portions 1b2 and 1b3, in other words, at the four, front, rear, right and left corners of the tetrahedral frame. Therefore, the mechanical strength of the plate terminal 1 is increased, and a predetermined press-in operation with a hammer or the like can be performed smoothly and favorably without deformation in pressing the respective bent plate portions into the corresponding snug fit holes 8A, 8B, 8A', 8B'. Moreover, the terminal structure a2 obtained after having pressed the bent plate portions into the snug fit holes is very greatly effective in preventing the plate terminal 1A from coming off, owing to the fixation of the teeth 7a, 7b, 7a', 7b' at the four, front, rear, right and left parts in engagement with the respective opposing inner wall faces 8a, 8b, 8a', 8b'. On the other hand, the plate terminal 1A undergoes no turning in any of all directions, vertical fluctuations, twisting, deformation etc. due to a very large torque which is ascribable to bolting. Accordingly, the second embodiment brings forth the terminal structure a2 which is still more stable and stout as compared with the terminal structure a1 of the first embodiment.

By the way, the plate terminal 1A in the shape of the tetrahedral frame exemplified in the figures is worked as stated below. In punching the plate terminal 1A from a blank brass plate, each of the lower plate portions of the front vertical plate portion 1b2 and the rear vertical plate portion 1b3 is punched wider than each of the upper plate portions thereof corresponding with the bent plate portions which are to be formed at the right and left. Thereafter, both the sides of the lower plate portions are subjected to bending works to form the bent plate portions 17a, 17b, 17a', 17b'. In the plate terminal 1A of the illustrated embodiment, in a case where the rear vertical plate portion 1b3 is formed vertically shorter than the front vertical plate portion 1b2 as shown in the figures, in the bending of the downward U-shaped crooked plate portion 1c, the bent plate portions 17a', 17b' of the wider plate portions of the lower plate portion of the rear vertical plate portion 1b3 are previously cut and worked to a length at which their lower ends reach the lower end of the front vertical plate portion 1b2, and they are subsequently bent and worked.

Further, an intermediate snug fit hole 8C is usually provided which is adapted to pressedly insert the intermediate portion 6c of the lower plate portion 6 of the front vertical plate portion 1b2 as is not bent rearwards, at the same time that the lower ends of the front and rear, and right and left bent plate portions 17a, 17b, 17a', 17b' at the lower part of the plate terminal 1A worked as explained above are respectively pressed into the front and rear, and right and left snug fit holes provided in the cover C. As clearly shown in FIG. 7, the intermediate snug fit hole 8C is held in communication with the right and left snug fit holes 8a, 8b and is formed into a generally U-shaped recessed snug fit hole.

Incidentally, such a plate terminal 1A in the shape of the tetrahedral frame has its mechanical strength against a pressing-in force increased by bending each of the four corners into an L-shape. Therefore, the blank plate which is worked into the plate terminal 1A by punching and bending may be one which is thinner than a blank plate having hitherto been used and being at least 2 mm thick, and which is about 1.5 mm thick by way of example. Moreover, with the thinner blank plate being about 1.5 mm thick, the precision for bending the blank plate into the L-shape increases. Simultaneously, since the heat capacity of the plate terminal 1A can be decreased, the operation of soldering this plate terminal to a lead bushing E can be quickly performed.

In a case where the plate terminal in the prior art is mounted on the cover as described above and where the bolt and the nut are tightened, for example, laterally in order to clamp the plate terminal for the use of the storage battery, a hexagon nut is accommodated in the nut accommodation space on the backside of the plate terminal and is placed and received on the flat upper face of the supporter protrusion, and the bolt inserted through the bolt insertion hole of the vertical plate portion is threadably inserted into the nut on the backside so as to be tightened. Herein, since the supporter protrusion is unitarily molded of a synthetic resin at the molding of the cover C, it is weak. Therefore, the nut shakes, and the function of preventing the nut from turning is unsatisfactory. Especially in a case where a large space is defined over the nut and between the nut and the back face of the horizontal plate portion of the plate terminal, such drawbacks are liable to occur that the nut idles, so desired bolting is not quickly and easily attained, and that the plate terminal floats in the turning.

In order to eliminate such drawbacks, the present invention provides a terminal structure which adopts a toothed or corrugated plate terminal in the present invention, which dispenses with the supporter protrusion having the nut receiving face as brings about the drawbacks of the prior art. A nut receiver is provided in the plate terminal itself, whereby when a bolt and a nut are laterally tightened, the nut is firmly received, the plate terminal does not float, and the bolting operation can be performed quickly, reliably and rigidly. FIG. 11 through FIG. 14 show such an embodiment. This embodiment includes a plate terminal 1B, which is basically constructed of the toothed or corrugated plate terminal 1 of the type shown in the foregoing first embodiment. Herein, a rectangular, upward U-shaped cut 18 is provided under the bolt insertion hole 4 of the vertical plate portion 1$b$2 of the plate terminal 1B. The resulting U-shaped free plate part is bent at a right angle inwards, thereby forming a nut receiving horizontal plate portion 19 made of a metal plate which is unitarily and horizontally protruding from the middle part of the vertical plate portion 1$b$2. In this case, the horizontal plate portion 19 protruding in the plate terminal 1B should preferably function, not only as a nut receiver, but also as a turning stopper. More specifically, as clearly shown in FIG. 13, the height position of the horizontal plate portion 19 may be so set that a space which is adapted to snugly insert a hexagon nut J with the opposing side faces of the nut oriented at the top and bottom of the space is defined between the upper face of the horizontal plate portion 19 and the back face of the overlying horizontal plate portion 1$b$1 of the plate terminal 1B.

Incidentally, when the above plate terminal 1B is employed, a nut receiving supporter protrusion need not be provided on the side of a cover C. As shown in the figures, however, a supporter protrusion 11 may well be formed with a bearing face 11$b$ which bears the lower face of the nut receiving horizontal plate portion 19 in the present invention, whereby the nut receiving horizontal plate portion 19 brings forth a surer function of receiving the nut and stopping the turning of the nut.

Figure 13:
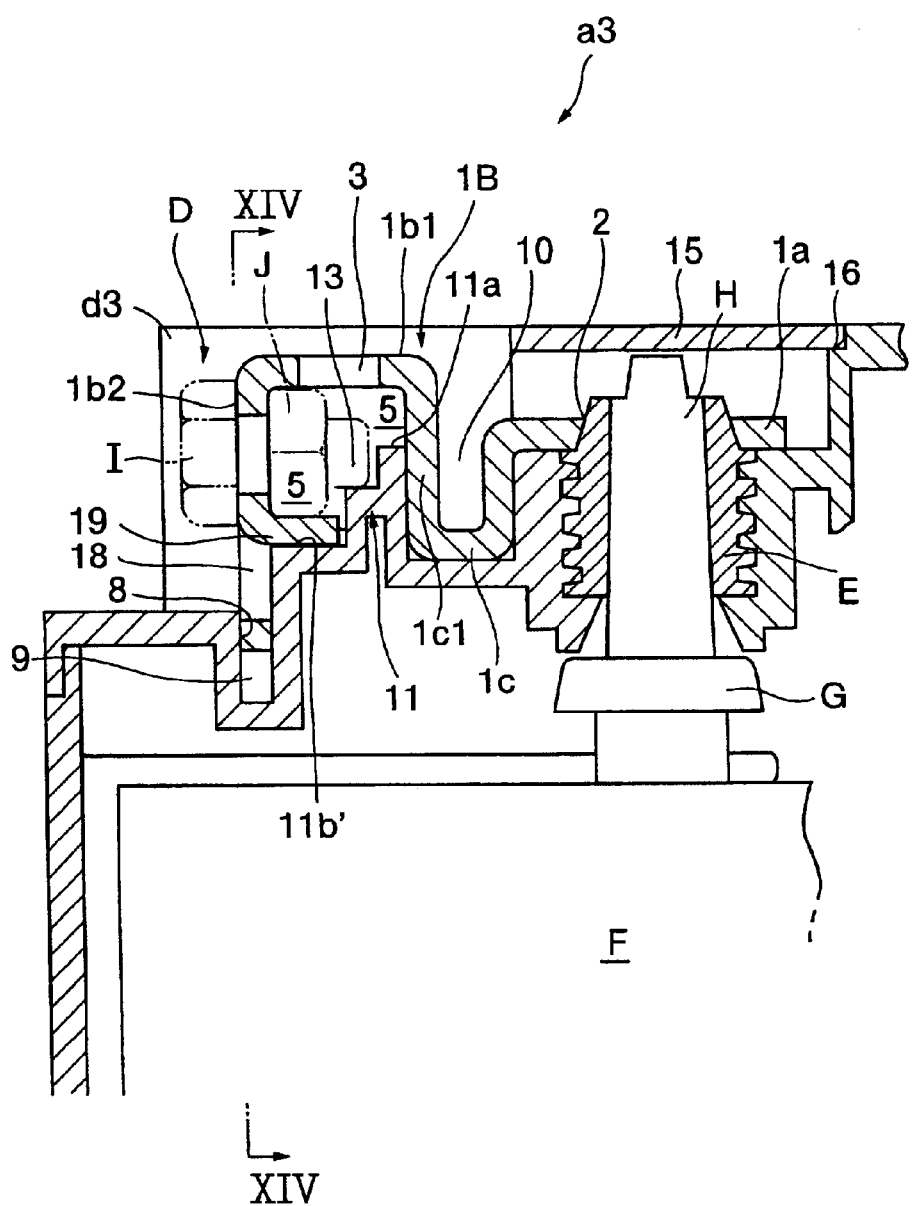
FIG. 13 is a sectional view taken along line XIII—XIII in FIG. 12.
Figure 14:
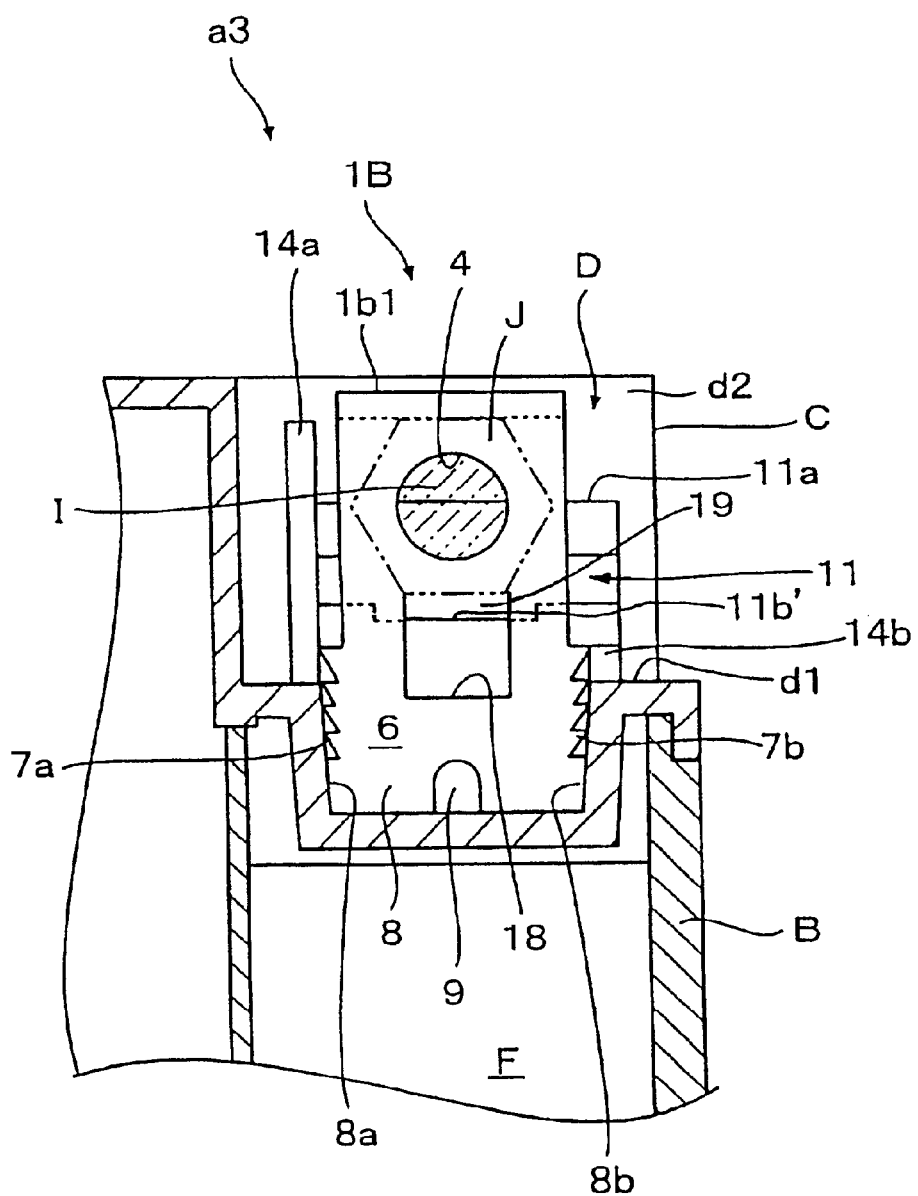
FIG. 14 is a sectional view taken along line XIV—XIV in FIG. 13.

Besides, the lower plate portion 6 of the vertical plate portion 1$b$2 of the plate terminal 1B is pressed into a snug fit hole 8 in a recessed groove shape, which is formed in the bottom face of a notch D at the corner 1C of the cover C of a storage battery body A in the same manner as in the first embodiment. Further, teeth or corrugations 7$a$, 7$b$ at both the side edges of the lower plate portion 6 are fixed to engage with the opposing inner wall faces 8$a$, 8$b$. Accordingly, a stable and stout terminal structure a3 is constructed which is reliably prevented from fluctuating in any of all horizontal directions or vertical directions due to a torque ascribable to bolting of the vertical plate portion 1$b$2. Thus, as shown in FIG. 13 and FIG. 14, in bolting an external terminal to the terminal structure a3, the hexagon nut J is snugly inserted into the space between the upper face of the horizontal plate portion 19 and the back face of the horizontal plate portion 1$b$1 with the opposing side faces of the nut oriented at the top and bottom of the space. A bolt I is inserted through the bolt insertion hole 4 of the vertical plate portion 1$b$2 and is tightened in threadable engagement with the nut J in this state. Herein, the horizontal plate portion 19 is the metal plate which is formed by bending part of the metallic vertical plate portion 1$b$2 inwards. Therefore, the nut J can be received on the upper face of the horizontal plate portion 19 firmly without shaking, and it is not floated or turned even by the threadable tightening of the bolt I, so that desired bolting can be performed smoothly and reliably.

On the other hand, since the vertical plate portion 1$b$2 has its lower plate portion 6 pressedly inserted and is prevented from coming off by the teeth 7$a$, 7$b$, the plate terminal 1B is reliably prevented from shaking in any of the horizontal and vertical directions in the same manner as in the first embodiment. Therefore, the horizontal plate portion 19 is held immobile at its initial appropriate position, and a tightening operation with a very large tightening force can be performed smoothly and quickly.

Needless to say, the nut receiver and turning stopper plate portion 19 which is formed by being bent and protruding inwards from the vertical plate portion 1$b$2 of the plate terminal 1B can be similarly provided in the front vertical plate portion 1$b$2 of the plate terminal 1A of the terminal structure a2 in the second embodiment of the present invention.

Figure 15:
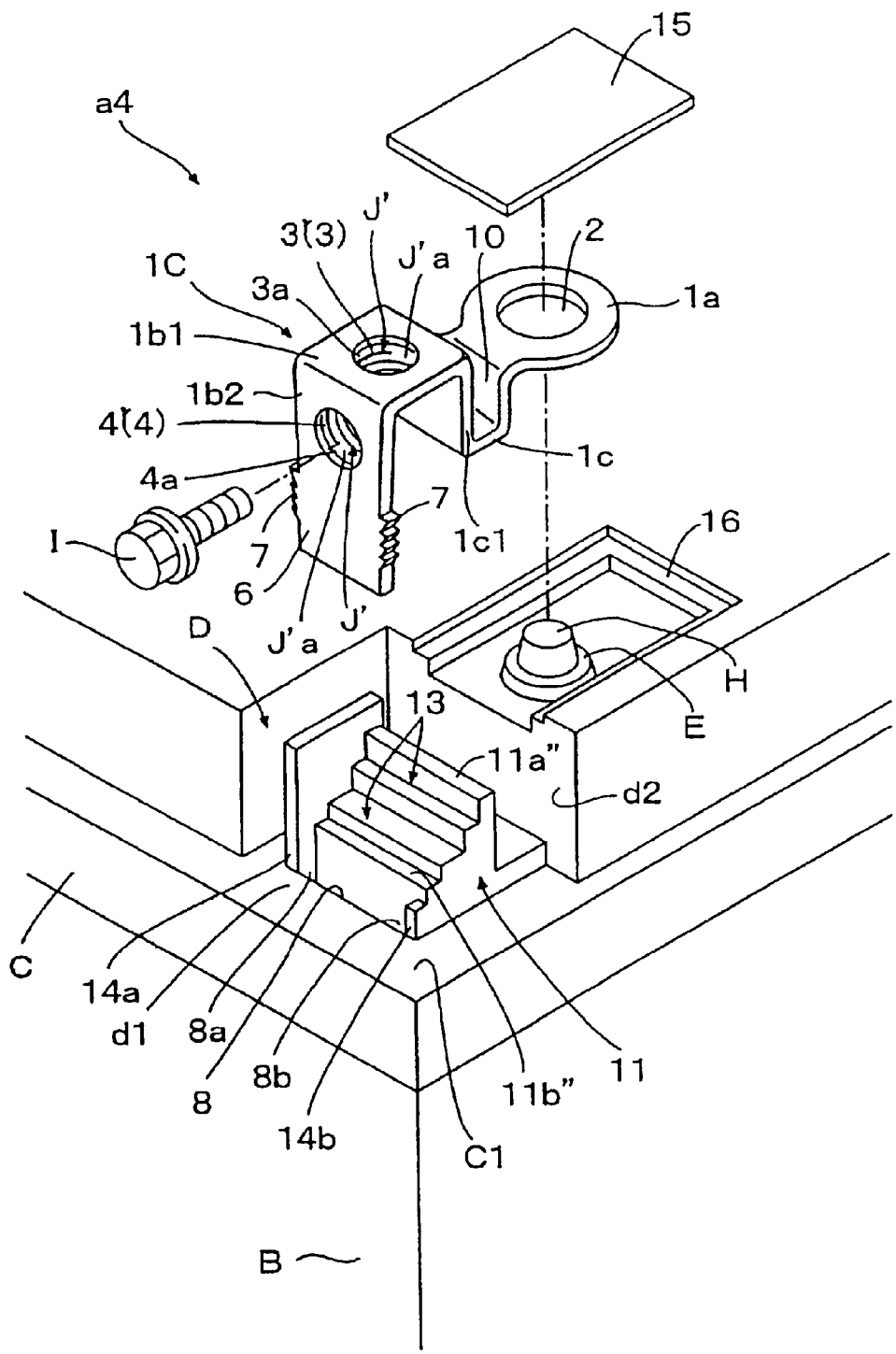
FIG. 15 is an exploded perspective view of a terminal structure in one polarity of a storage battery in yet another embodiment of the present invention, similar to FIG. 2 showing the first embodiment.
Figure 16:
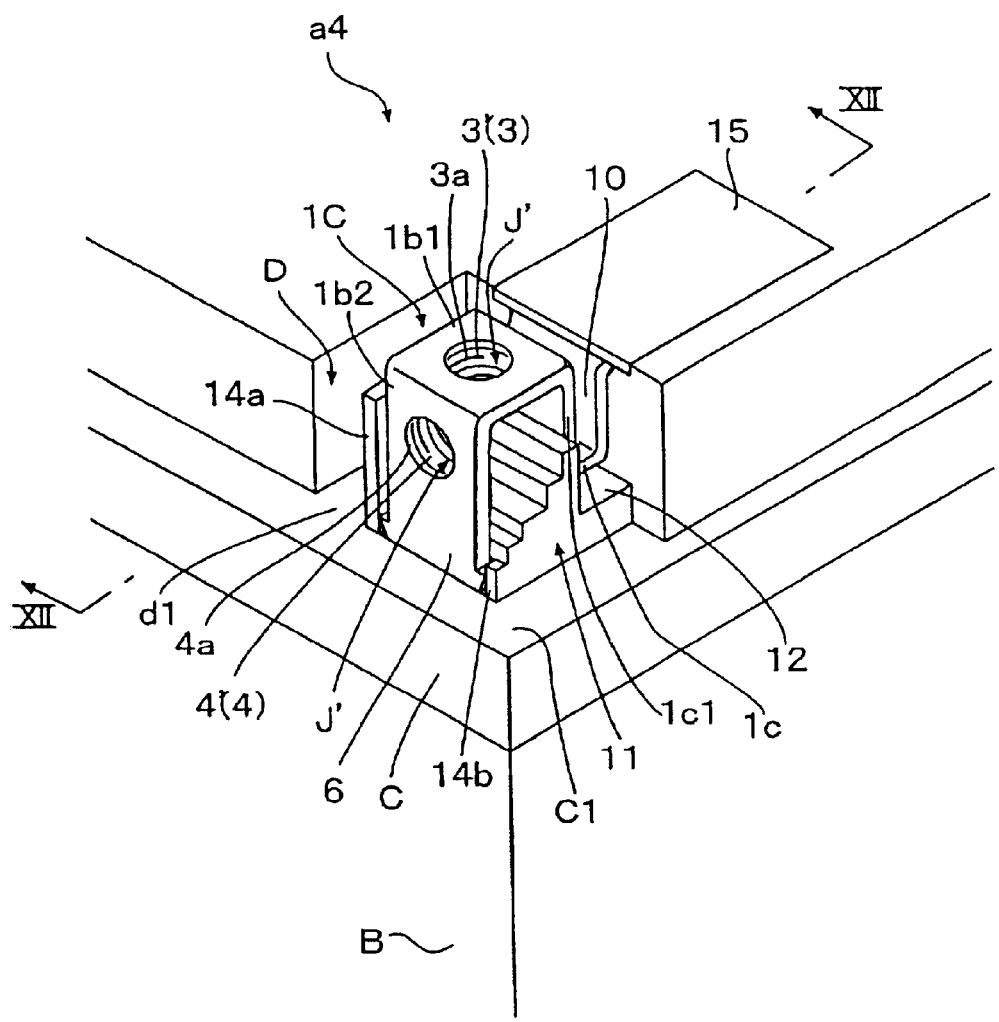
FIG. 16 is an assembled perspective view of the terminal structure in FIG. 15.
Figure 17:
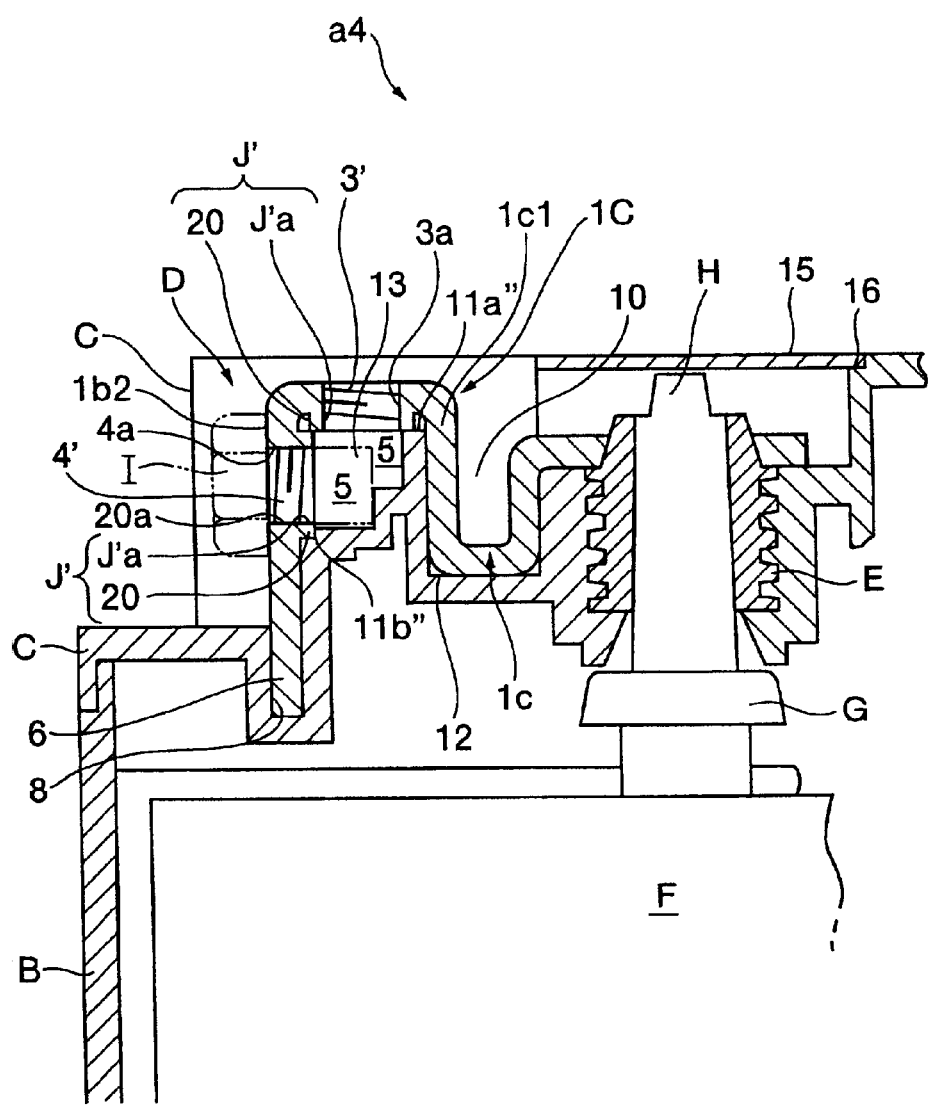
FIG. 17 is a sectional view taken along line XVII—XVII in FIG. 16.

It has heretofore been common practice that, in clamping an external terminal by a bolt and a nut, the nut separately prepared is inserted into a nut accommodation space on the backside of a plate terminal from outside so as to be arranged at a position which registers with a bolt insertion hole provided in the upper face or front face of the L-shaped plate terminal, and that the bolt is inserted through the bolt insertion hole so as to be threadably engage with the nut. Such a bolting operation is very troublesome, and it is very inefficient because a long time is required due to the idling of the nut. Accordingly, a stable and stout terminal structure is desired by which a bolting operation can be performed very easily and quickly, at a high efficiency, and rigidly. Yet another embodiment shown in FIG. 15 through FIG. 17 satisfies this objective.

This embodiment includes a plate terminal 1C, which is basically constructed of the toothed or corrugated plate terminal 1 of the type shown in the foregoing first embodiment. Herein, threaded cylinders J', J' are unitarily provided in the back face of the horizontal plate portion 1$b$1 of the plate terminal 1C so as to register with the bolt insertion hole 3 thereof, and in the back face of the vertical plate portion 1b2 of the plate terminal 1C so as to register with the bolt insertion hole 4 thereof, respectively. The lower plate portion 6 of the vertical plate portion 1b2 is pressed into the same snug fit hole 8 of recessed groove shape as in the first embodiment, which is formed in the bottom face d1 of the notch D of a cover C. Besides, teeth or corrugations 7, 7 provided at both the side edges of the lower end portion 6 are fixed to engage with the opposing inner wall faces 8a, 8b of the snug fit hole 8. Thus, a stable and stout terminal structure a4 according to the present invention is constructed.

More specifically, as seen from the figures, the use of the conventional nut J separately prepared is dispensed with. Instead, the threaded cylinders J', J' are unitarily formed by subjecting a brass blank plate to a pressing work and a threading work As clearly shown in FIG. 16 and FIG. 17, cylinders 20, 20 each of which protrudes a suitable length are unitarily formed in the back faces of the horizontal plate portion 1b1 and the vertical plate portion 1b2 so as to be coaxial with the corresponding bolt insertion holes 3, 4, and the inner peripheral faces of the circular holes of the cylinders 20, 20 which are equal in diameter to the bolt insertion holes 3, 4 are formed with internal threads J'a, J'a by the threading work, respectively. As shown in the figures, if desired, the inner peripheral face of the bolt insertion hole 3 of the horizontal plate portion 1b1 and that of the bolt insertion hole 4 of the vertical plate portion 1b2 may well be respectively formed with internal threads 3a, 4a. Thus, bolt threadable-insertion holes 3', 4' are formed, and the length of each of the threaded holes is increased as a whole.

Incidentally, as another means not shown, the conventional nut J separately prepared may well be unitarily bound onto the back face of the horizontal plate portion 1b1 or the vertical plate portion 1b2 by soldering or the like so as to become coaxial with the corresponding bolt insertion hole 3 or 4. Thus, a nut receiving supporter protrusion protrudes on the side of the cover C by unitary molding is dispensed with. In a case where a supporter protrusion 11 shown in the figures is provided for snugly fitting and supporting the front vertical plate portion 1b2 and rear vertical plate portion 1c1 of the plate terminal 1C in the same manner as in the foregoing embodiments, the upper face and front face of the supporter protrusion 11 may well be respectively formed with abutment faces 11a", 11b" which bear the inner ends of the corresponding threaded cylinders J', J' in abutment on them.

In this way, the toothed plate terminal 1C has the lower plate portion 6 of the vertical plate portion 1b2 pressed into the snug fit hole 8 which is formed in the cover C and which has the same construction as in the first embodiment, and the teeth 7, 7 at both edges of the lower plate portion 6 are respectively fixed in engagement with the opposing inner wall faces 8a, 8b of the snug fit hole 8, whereby the terminal structure a4 which is very stable and stout against a tightening torque is obtained. Further, since the back faces of the horizontal plate portion 1b1 and vertical plate portion 1b2 of the plate terminal 1C are unitarily provided with the threaded cylinders J', J' beforehand, respectively, the labor in which the nut separately prepared is inserted into the backside space of the plate terminal 1C from outside and is registered with the bolt insertion hole 3 or 4 can be omitted. Still further, a bolt I may merely be threadably inserted into the upper or front threaded cylinder Y of the plate terminal 1C and be tightened. Of course, the threaded cylinder J' neither shakes nor idles. Accordingly, the bolting operation can be performed easily and quickly, and intense bolting is permitted. A nut turning stopper need not be separately formed on the side of the cover C. After all, the terminal structure a4 is simple in construction and low in cost.

The unitary construction of the nut for the plate terminal has been exemplified as an application to the plate terminal 1 indicated in the first embodiment. Needless to say, however, the unitary construction is not restricted to the example, but it is applicable to various toothed plate terminals of desired shapes in the present invention as included in the second embodiment etc.

Figure 18:
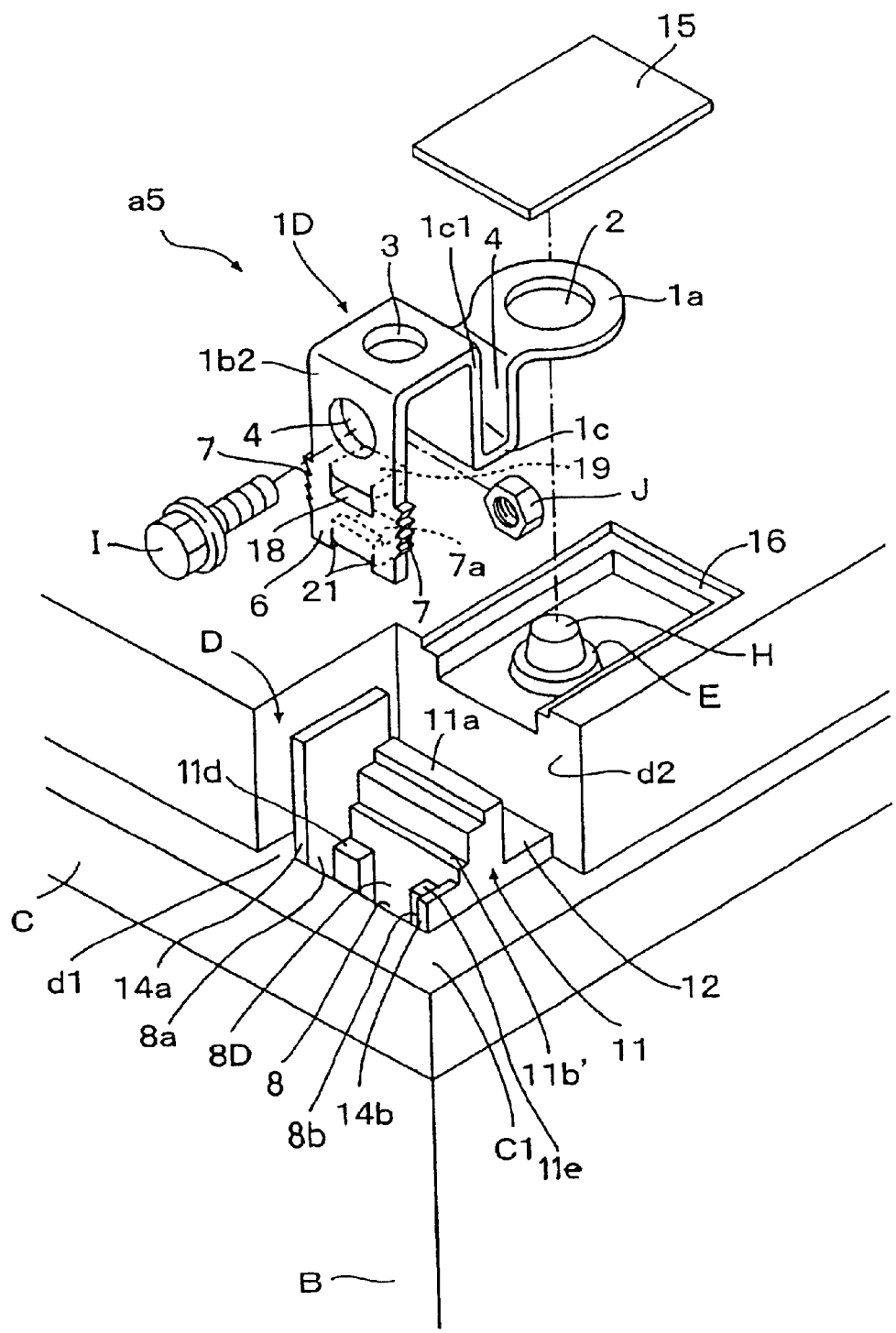
FIG. 18 is an exploded perspective view of a terminal structure in one polarity of a storage battery in a further embodiment of the present invention, similar to FIG. 2 showing the first embodiment.
Figure 19:
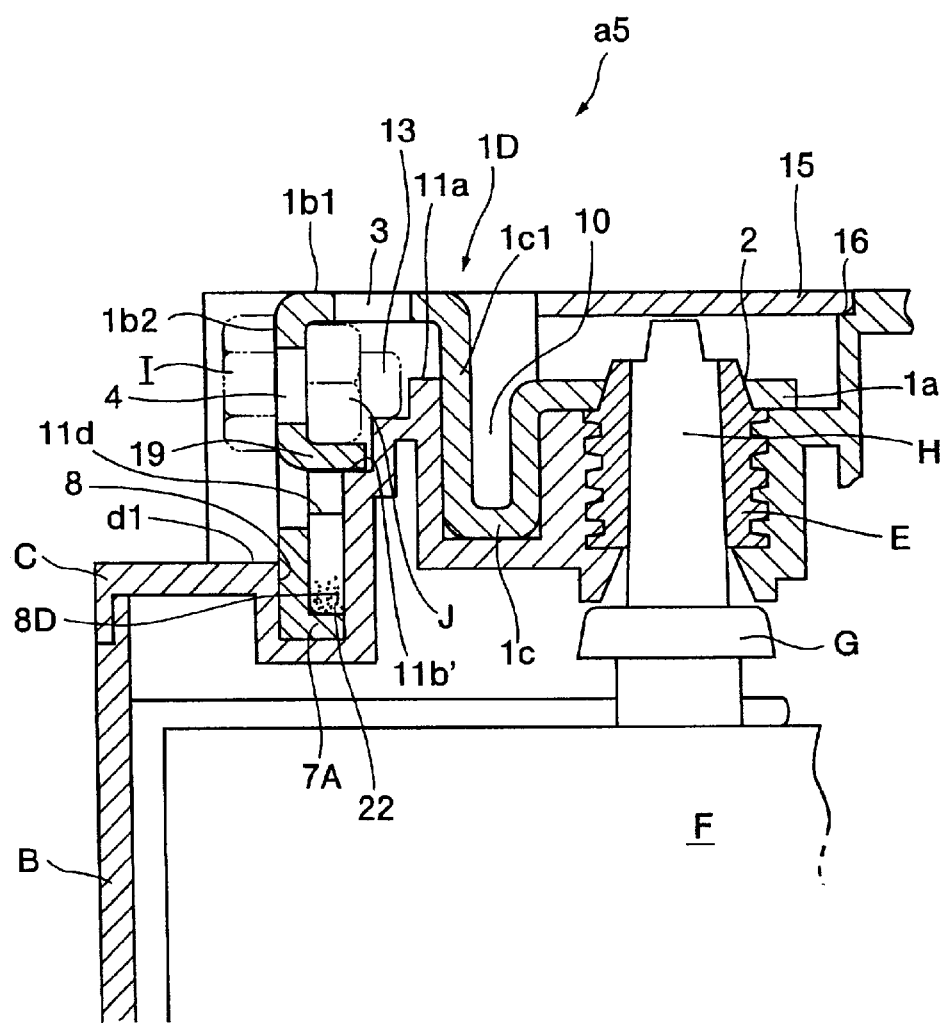
FIG. 19 is a sectional view of the terminal structure in FIG. 18, similar to FIG. 4.

FIG. 18 and FIG. 19 show yet another embodiment, which provides a terminal structure as that is more stable and stout against bolting. This embodiment includes a toothed or corrugated plate terminal 1D, which is basically constructed of the plate terminal 1B of the type having the nut receiver and turning stopper plate portion 19 as shown in FIG. 11–FIG. 14. Herein, the lower end part of the vertical plate portion 1b2 of the plate terminal 1D under the bolt insertion hole 4 thereof is provided with vertical cuts 21, 21 which reach the lower end of the vertical plate portion 1b2 and which have lateral equal intervals from the widthwise center line of the vertical plate portion 1b2. Besides, a free plate part formed between the cuts 21, 21 is bent at a right angle inwards. Thus, a rectangular engagement-fixing horizontal plate portion 7A is formed. On the other hand, the cover C of a storage battery body A is formed with a snug fit hole 8 which is adapted to pressedly insert the lower plate portion 6 of the vertical plate portion 1b2, and a snug fit hole 8D which is extended from the intermediate part of the snug fit hole 8 rearwards in communication and which is adapted to pressedly insert the engagement-fixing horizontal plate portion 7A of the plate terminal 1D. Reference signs 11d, 11e denote right and left opposing walls which hold both the side edges of the engagement-fixing horizontal plate portion 7A in pressed contact. In this manner, the plate terminal 1D can offer the terminal structure 5a which is even more stable and stout. More specifically, the lower plate portion 6 of the vertical plate portion 1b2 of the plate terminal 1D is pressed into the snug fit hole 8, and teeth or corrugations 7, 7 on both the sides of the lower plate portion 6 are fixed engaging with the opposing inner wall faces 8a, 8b of the snug fit hole 8. In addition, as shown in FIG. 19, the engagement-fixing horizontal plate portion 7A is pressedly inserted and secured into the snug fit hole 8D.

Accordingly, the effect of preventing the plate terminal 1D from turning due to a torque in a bolting operation is intensified even more.

More preferably, inpressing the engagement-fixing horizontal plate portion 7A of the plate terminal 1D into the snug fit hole 8D, this snug fit hole 8D is filled up with a hardenable adhesive 22, whereby the binding fixation strength of the plate terminal 1D is and the effect of preventing the plate terminal 1D from turning due to the bolting can be increased.

Figure 20:
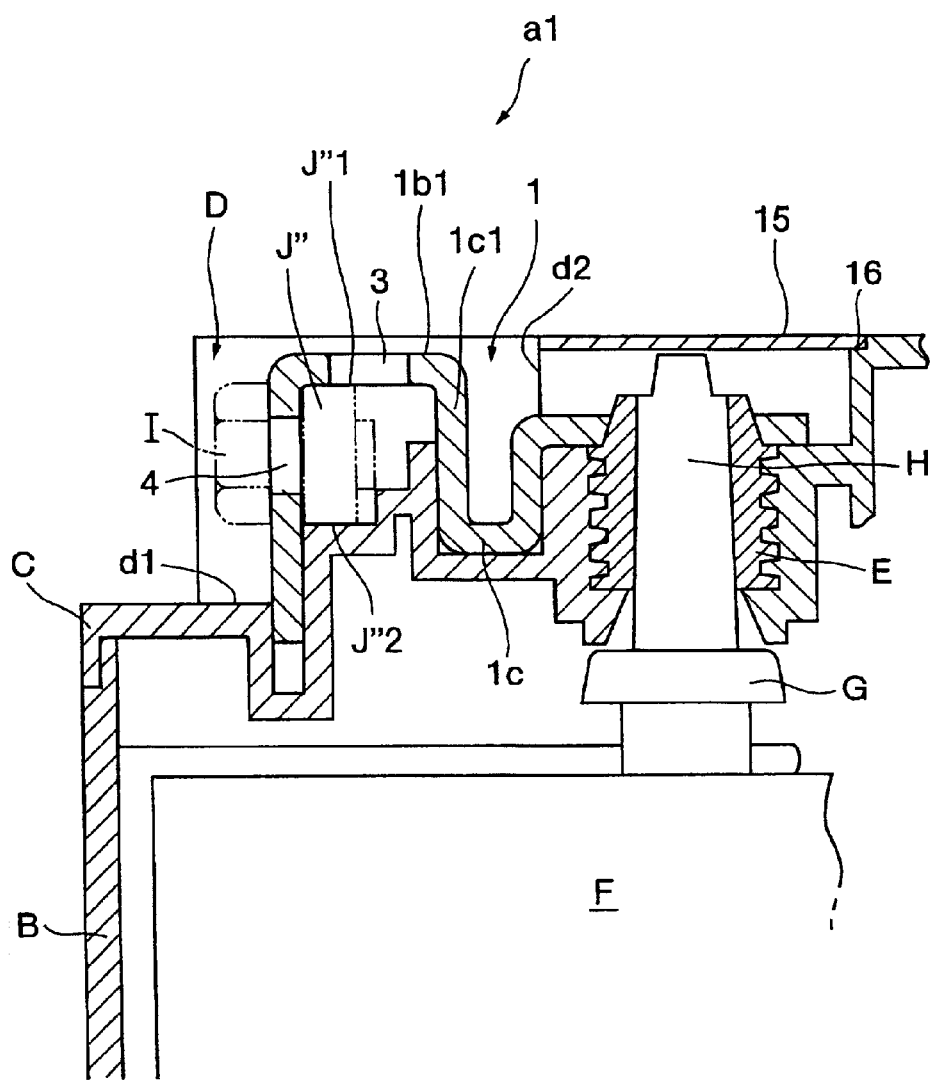
FIG. 20 is a lengthwise sectional view of a terminal structure of the present invention showing a favorable state of use thereof, similar to FIG. 4.
Figure 21:
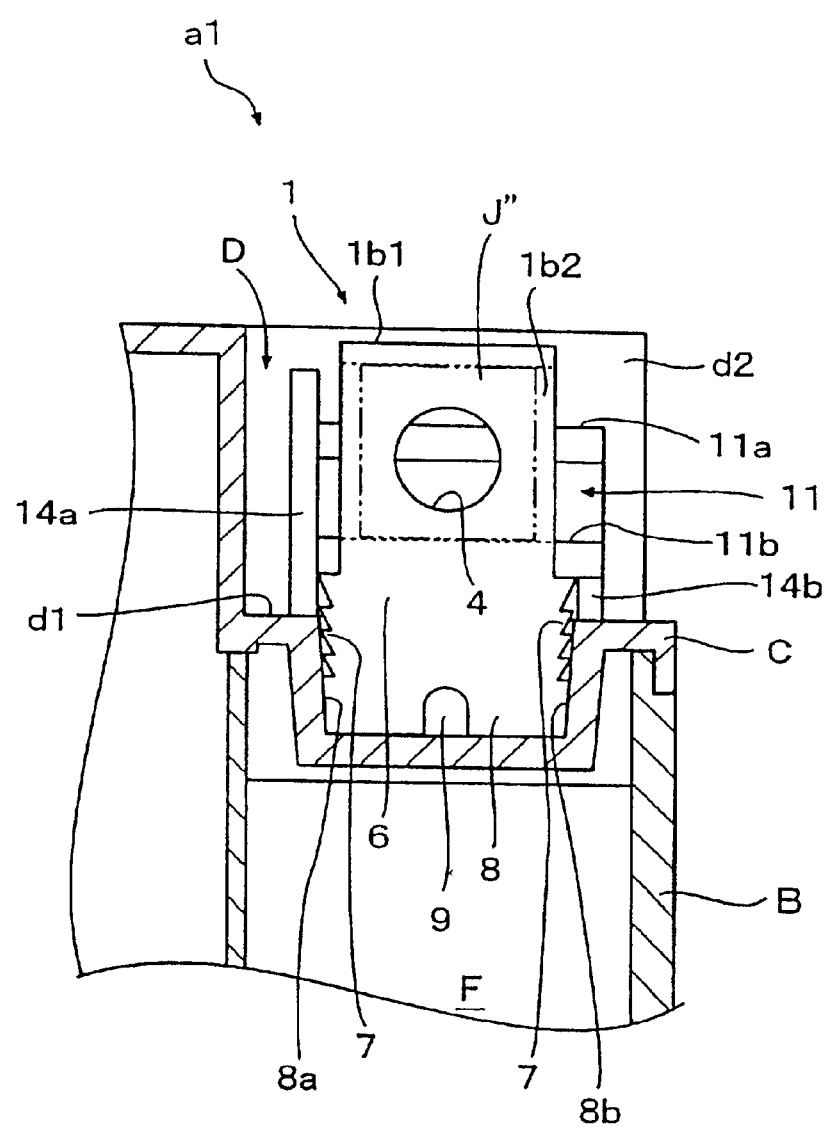
FIG. 21 is a widthwise sectional view of the terminal structure of the present invention showing the favorable state of use, similar to FIG. 5.

Meanwhile, a hexagon nut is generally used in coupling an external terminal by clamping it with a bolt and a nut. Since the respectively adjacent side faces of the hexagon nut define angles of 60 degrees, the hexagon nut is comparatively unstable when placed on the upper face of a nut receiving supporter protrusion having hitherto been provided on a cover side. When the bolt is threadably inserted into the hexagon nut so as to be tightened, the hexagon nut is liable to turn and float due to the turning torque of the threadable insertion of the bolt, so that stable and favorable bolting sometimes fails to be attained. In order to relieve this drawback, a square nut whose side faces define angles of 90 degrees and which is stable should preferably be used instead of the hexagon nut. An example of such performance is shown in FIG. 20 and FIG. 21. By way of example, the same terminal structure a1 as shown in FIG. 1–FIG. 5 is constructed on the cover C of the storage battery body A by employing the plate terminal 1 of the type indicated in the first embodiment. Thereafter, a bolt and a nut are tightened in order to couple an external lead terminal (not shown) to the plate terminal 1. Herein, the hexagon nut J used in the first embodiment is replaced with a square nut J" as shown in FIG. 20 and FIG. 21. On this occasion, the square nut J" having the four side faces at right angles is stabler than the hexagon nut against a torque produced by wrenching the bolt I, and it is not apprehended at all to turn due to the torque, unlike the hexagon nut. In this case, as shown in the figures, the square nut J" may be snugly inserted in a state where its upper and lower side faces J'1, J'2 opposing to each other are respectively held in contact with the back face of the horizontal plate portion 1b1 of the plate terminal 1 and the flat upper face 11b of the supporter protrusion 11 of the cover C. Then, the square nut J" is more reliably prevented from turning, and very intense bolting can be performed stably and favorably.

In the present invention, the number, size, shape etc. of the teeth or corrugations, which are provided as the engagement portion on each of both the sides of the lower plate portion of the vertical plate portion of the plate terminal, differ depending upon the size of the plate terminal. Besides, the teeth may well be so formed as to be slightly bent in lateral directions and in succession, like saw teeth. Thus, the degree of engagement of the teeth with the opposing inner wall faces can be heightened to increase the effect of preventing the plate terminal from coming off upwards.

Further, the inventors have found out the following favorable fact on the basis of a large number of tests. In pressing the lower plate portion of the vertical plate portion of any of toothed or corrugated plate terminals in the present invention as include all the above embodiments, into a snug fit hole provided on the side of a cover, the lower plate portion to be inserted is heat-treated by a heater, a burner or the like and is pressed into the snug fit hole in a heated state, or it is pressed into the snug fit hole while being ultrasonically vibrated, whereby a terminal structure is obtained which is more stable and stout than in a case where such a treatment is not carried out.

FIG. 22 through FIG. 25 show another example of performance of the present invention. This embodiment includes terminal structures a6, a6 in the present invention in such a manner that plate terminals 1E, 1E in the present invention are respectively attached to the upper end parts of the positive and negative electrode poles of the same sealed lead acid battery body for a motor bicycle as in any of the foregoing embodiments. In these figures, the construction and members of the lead acid battery body are the same as in the first embodiment, and hence, the same reference numerals and signs shall be respectively assigned thereto.

Here in the embodiment shown in FIG. 22–FIG. 25, the right and left terminal structures a6, a6 respectively disposed at the right and left corners C1, C1 of the cover C of the storage battery in the present invention have the same construction. In the following, therefore, one terminal structure a6 in the embodiment shall be described in detail.

Figure 22:
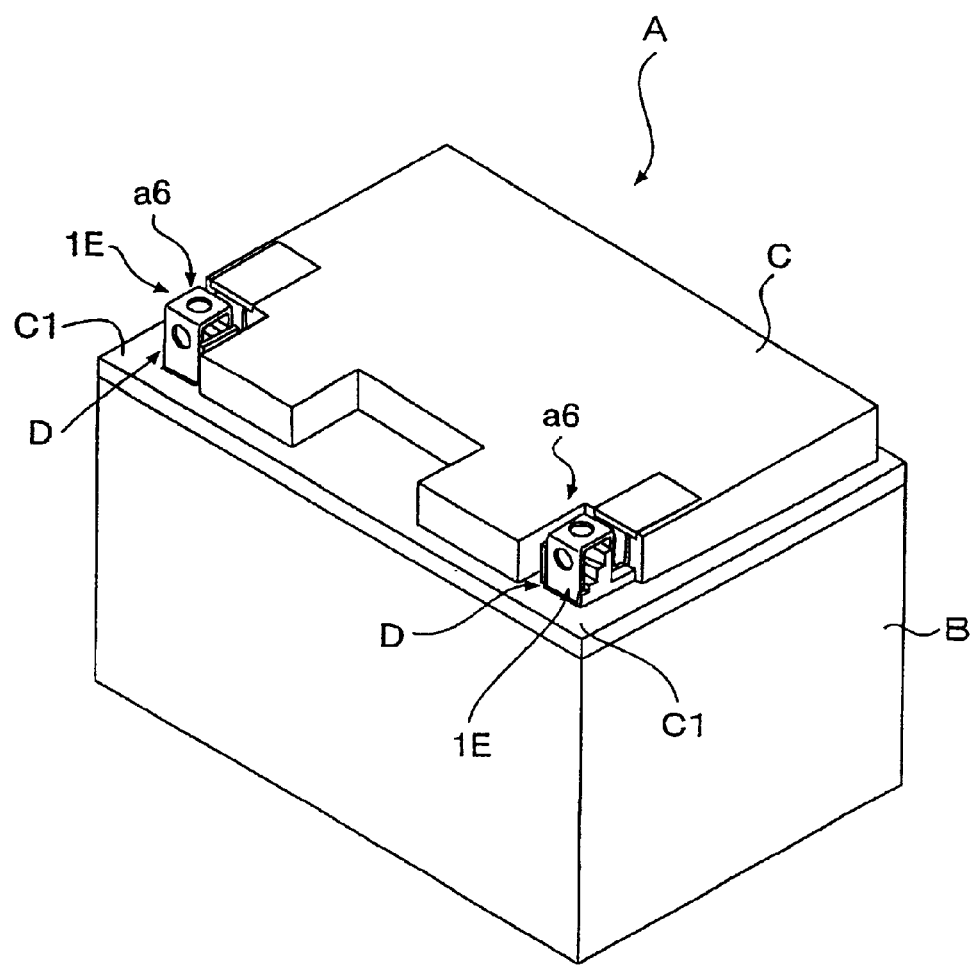
FIG. 22 is a perspective view of a storage battery which includes a terminal structure in another example of performance of the present invention.
Figure 23:
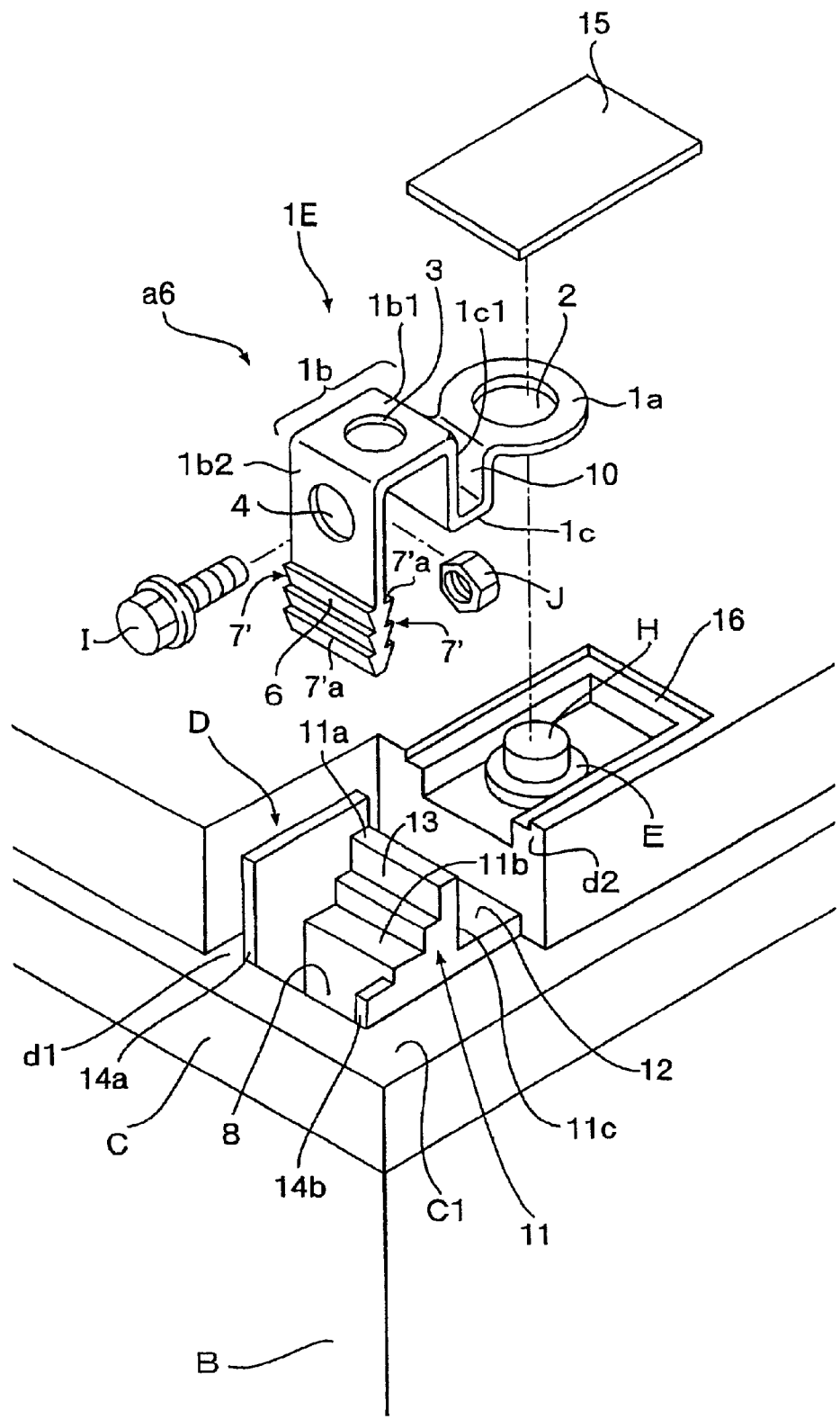
FIG. 23 is an exploded perspective view of the terminal structure in one polarity in FIG. 22.
Figure 24:
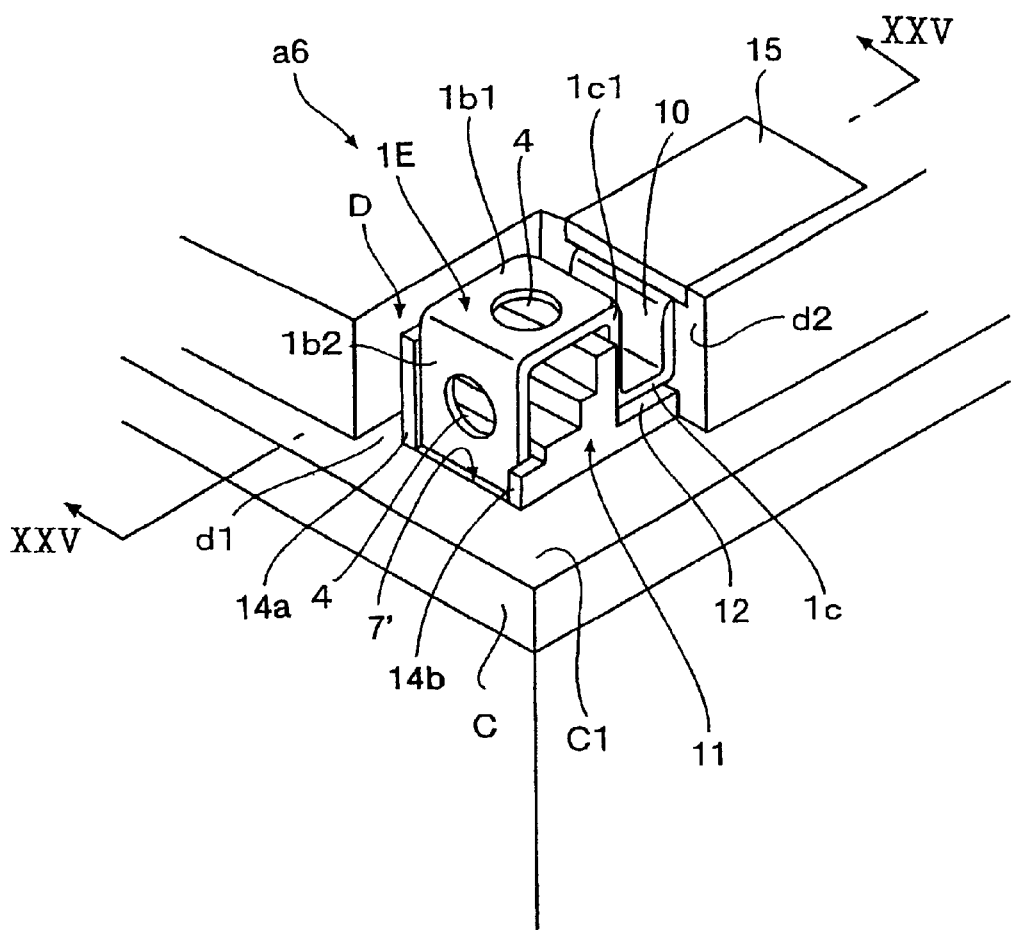
FIG. 24 is an assembled perspective view showing the assembled state of the terminal structure in FIG. 23.
Figure 25:
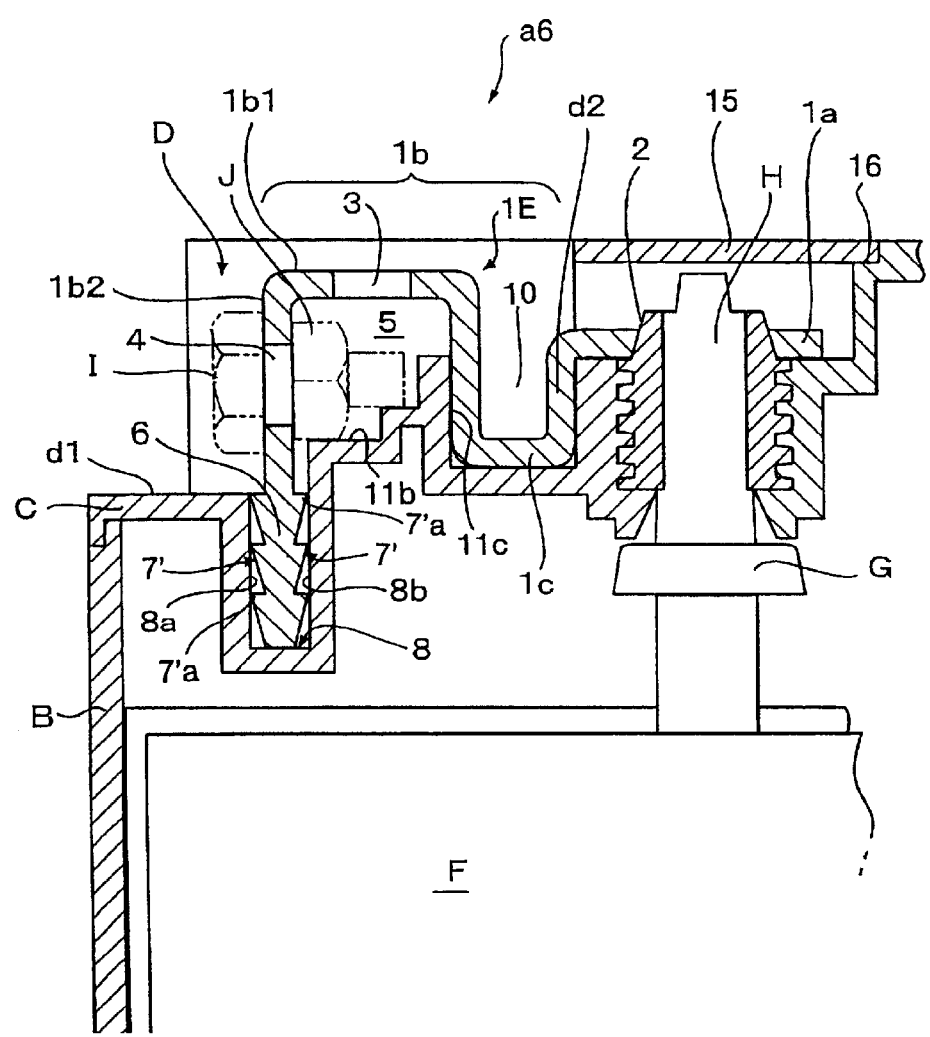
FIG. 25 is a sectional view taken along line XXV—XXV in FIG. 24.

In the embodiment shown in FIG. 22–FIG. 25, FIG. 23 shows an exploded perspective view of the terminal structure a6 of the present invention shown in FIG. 22. The plate terminal 1E in the present invention is formed of an elongate rectangular metal plate of good conductivity, which is thin, tough and elastic and is about 2–2.5 mm thick, and which is made of, for example, brass. One end plate portion 1a of the plate terminal 1E is formed with a circular hole 2 which is adapted to snugly fit on a lead bushing E surrounding the electrode pole H. When the end plate portion 1a is snugly fit on the lead bushing E, the led-out plate portion 1b of the plate terminal 1E led out to the notch D of the cover C is made an L-shaped one 1b whose distal end side is vertically bent downwards. The horizontal plate portion 1b1 and vertical plate portion 1b2 of the led-out plate portion 1b are respectively provided with bolt insertion holes 3 and 4, and nut accommodation spaces 5, 5 are respectively defined on the backsides of the horizontal plate portion 1b1 and vertical plate portion 1b2. Although the above construction does not differ from the construction of a plate terminal in the prior art, the plate terminal 1E in the present invention is provided with an engagement portion 7' on at least one of the front and back faces of the lower plate portion 6 of the vertical plate portion 1b2. In the preferred embodiment shown in the figures, a plurality of engagement-fixing protuberances 7'a, 7'a, are disposed on each of the front and back faces of the lower plate portion 6, thereby to form the engagement-fixing faces 7', 7'. Although the shape and arrangement of the engagement-fixing protuberances 7'a, 7'a, . . . on each of the front and back faces of the lower plate portion 6 may be as desired, the illustrated example is so constructed that three teeth are vertically arrayed each of which extends over the full width of the lower plate portion 6 and which are unidirectional likewise to arrowheads or saw teeth. In other words, that the engagement-fixing protuberances 7'a, 7'a, 7' are provided in three stages, whereby the engagement-fixing face 7' consisting of the teeth or corrugations is formed as a whole. Of course, the engagement-fixing protuberances are not restricted to the tooth or a corrugation shape, but small protuberances each of which is in the shape of a pyramid, a prism or the like and which protrude from the front face or/and back face of the lower plate portion 6 may well be regularly or irregularly disposed on the whole face or faces.

In the illustrated embodiment, the toothed or corrugated lower plate portion 6, in which both the front and back faces are formed into the engagement-fixing faces 7', 7' as stated above, is pressed into a snug fit hole 8 of recessed groove shape which is formed in the bottom face d1 of the notch D at the corner C1 of the cover C, and which has dimensions adapted to pressedly insert the lower plate portion 6. In general, the dimensions of the snug fit hole 8 are so set that the rectangular opening thereof has a thickness (or height) and a width which are respectively equal or substantially equal to the thickness and width of the lower plate portion 6, and a depth which can receive parts or all (in the illustrated example, all) of the engagement-fixing faces 7', 7'. The lower plate portion 6 is pressed into the snug fit hole 8 in the recessed groove shape while the upper face of the horizontal plate portion 1b1 is being hit with, for example, a hammer, until the engagement-fixing protuberances 7'a, 7'a, 7'a and those 7'a, 7'a, 7'a of the front and back engagement-fixing faces 7', 7' are respectively fixed in engagement with the front and rear opposing wall faces 8a, 8b of the snug fit hole 8. Thus, the terminal structure a6 of the storage battery according to the present invention is constructed.

In this manner, according to the terminal structure a6 of the present invention, the plate terminal 1E has the lower plate portion 6 of its vertical plate portion 1b2 pressedly inserted into, and fixed in engagement with, the snug fit hole 8 in the top face of the cover C. Therefore, in a case where an external connection terminal is clamped and bound to the plate terminal 1E by a bolt and a nut, the bolt I is inserted through the bolt insertion hole 3 provided in the horizontal plate portion 1b1 of the plate terminal 1E or the bolt insertion hole 4 provided in the vertical plate portion 1b2 thereof, and it is screwed into the nut J inserted in the corresponding nut accommodation space 5 on the backside of the horizontal or vertical plate portion. Even when the plate terminal 1E undergoes a large torque arising on this occasion, it is reliably prevented from turning in a horizontal direction, twisting, deforming, etc. Especially in the plate terminal 1E in the present invention, the engagement-fixing faces 7', 7' consisting of the tooth-like engagement-fixing protuberances 7'a, 7'a, 7'a and 7'a, 7'a, 7'a, which protrude to be long in the widthwise direction of the large-area front and back faces of the lower plate portion 6, are fixed to engage with the opposing wall faces 8a, 8b of the snug fit hole 8. Therefore, the engagement-fixing force of the plate terminal 1E is remarkably enlarged as compared with that of the plate terminal 1 in the first embodiment in which the teeth or corrugations 7, 7 formed at both the side edges of the thin plate terminal 1 as shown in FIG. 2 are fixed to engage with the opposing walls of the snug fit hole 8. In particular, the resistance of the plate terminal 1E against an upward external force is increased to remarkably enhance the effect of preventing the plate terminal 1E from coming off. Accordingly, the terminal structure a6 which is very stable and stout is brought forth.

By the way, in the plate terminal 1E, the same constituent portions as in the plate terminal 1 of the first embodiment are designated by the same reference numerals and signs. The same holds true of the following embodiments of plate terminals.

Figure 26:
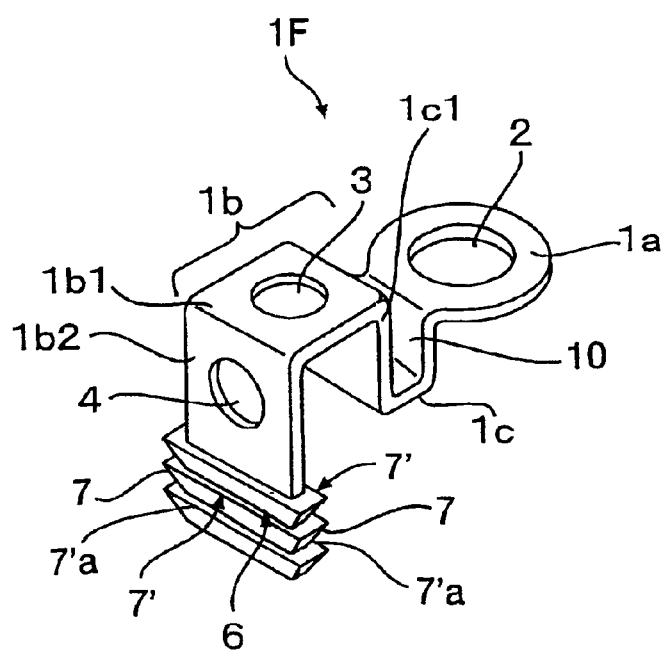
FIG. 26 is a perspective view of a plate terminal in a modified embodiment for use in the present invention.

FIG. 26 shows a modified embodiment 1F of a plate terminal which is the constituent element of the terminal structure of a storage battery in another embodiment of the present invention, and which is substituted for the plate terminal 1E employed in the preceding embodiment. In the plate terminal 1F, engagement-fixing means is so formed that, in addition to engagement-fixing faces 7', 7' formed by arrangement of tooth-like engagement-fixing protuberances 7'a, 7'a, 7'a and 7'a, 7'a, 7'a which are respectively provided on both the front and back faces of the lower plate portion 6 of the vertical plate portion 1b2 of the plate terminal 1F, the same teeth or corrugations 7, 7 as shown in FIG. 2, which are respectively fixed in pressed engagement with the right and left opposing wall faces of a predetermined snug fit hole, are provided at both the right and left side edges of the lower plate portion 6 as engagement portions. Since the other constituent portions of the plate terminal 1F are the same as in the preceding embodiment, they are designated by the same reference numerals and signs.

Besides, when the plate terminal 1F is pressed into the snug fit hole, not shown, which is provided as a recess in a cover and adapted to pressedly insert the plate terminal 1F, the engagement-fixing protuberances 7'a, 7'a, 7'a and 7'a, 7'a, 7'a are formed on the front and back faces of the vertical plate portion 1b2 of the plate terminal 1F are respectively fixed in engagement with the front and rear opposing wall faces of the snug fit hole, and at the same time, the teeth 7, 7 at both the side edges of the vertical plate portion 1b2 are respectively fixed in engagement with the right and left opposing wall faces of the snug fit hole. Thus, the terminal structure is still further more stable and stout.

Figure 27:
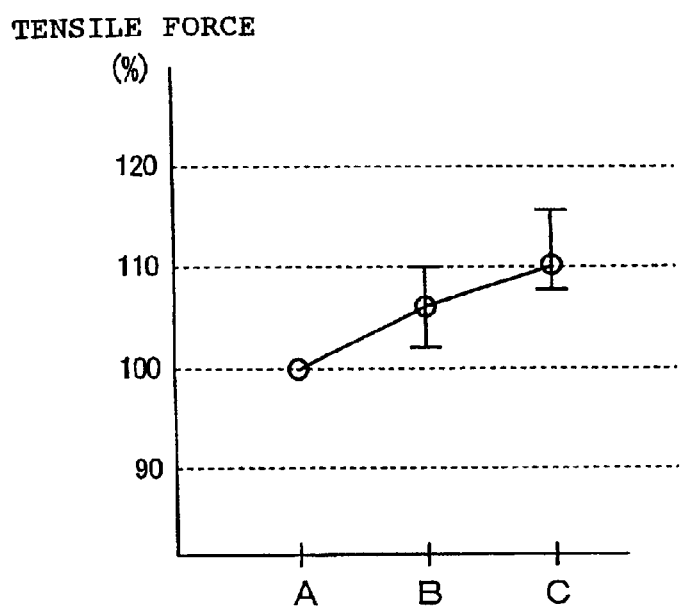
FIG. 27 is a graph showing the excellent tensile forces of terminal structures which employ the plate terminals in the present invention.

A large number of samples of terminal structures were prepared in each of which the plate terminal 1E in the present invention as shown in FIG. 22, the plate terminal 1F in the present invention as shown in FIG. 26 or the plate terminal 1 of the first embodiment as shown in FIG. 2 was pressed into the snug fit hole provided as the recess in the cover so as to be fixed to engage by the corresponding teeth or/and protuberances, and the terminal structures were respectively applied to the storage batteries. Thereafter, an upward tensile force was exerted on each of the plate terminals, and a tensile force at the moment at which the plate terminal came out of the snug fit hole was measured. Then, a result as shown in FIG. 27 was obtained. It has accordingly been verified that, when the tensile force in the tension test A for the plate terminal 1 of the first embodiment is set at 100%, the tensile force in the tension test B for the plate terminal 1E in the present invention as shown in FIG. 22 increases to about 103–110%, while the tensile force in the tension test C for the plate terminal 1F in the present invention as shown in FIG. 26 increases to about 107–116%.

By the way, in pressing the plate terminal 1E shown in FIG. 22 into the snug fit hole, it may well be mechanically pressedly inserted as it is. More preferably, however, the plate terminal 1E is heated and is pressedly inserted in a heated state, or it is pressedly inserted while being irradiated with ultrasonic weaves, in a heated state based on the irradiation. Thus, the opposing wall faces of the snug fit hole which abut on the engagement-fixing protuberances disposed on the engagement-fixing front and back faces of the lower plate portion in the heated state are thermally softened slightly. Therefore, the engagement-fixing protuberances are fixed in engagement in a state where, at least, the distal end parts of the protuberances are embedded in the wall faces, though the embedment depends also upon the dimensions of the width and thickness of the snug fit hole. Accordingly, the tensile force of the plate terminal 1E against the coming-off thereof is increased to offer a terminal structure which is more stable and stout against twisting etc. Needless to say, also in a case where the plate terminal 1F additionally provided with the teeth at both the side edges of the lower plate portion as shown in FIG. 26 is pressed into the snug fit hole while being heated, the lower plate portion is similarly fixed in engagement in a state where it is embedded in the opposing wall faces.

FIG. 28 through FIG. 31 show yet another example of performance of the present invention. This embodiment includes terminal structures a7, a7 in the present invention in such a manner that plate terminals 1G, 1G are respectively attached to the upper end parts of the positive and negative electrode poles of the same sealed lead acid battery body for a motor bicycle as in the first embodiment described before. In these figures, the lead acid battery body and the constituent members thereof are the same in construction as those of the first embodiment, and hence, the same reference numerals and signs shall be respectively assigned thereto.

Here in the embodiment shown in FIG. 28–FIG. 31, the right and left terminal structures a7, a7 respectively disposed at the right and left corners C1, C1 of the cover C of the storage battery in the present invention have the same construction. In the following, therefore, one terminal structure a7 in the embodiment shall be described in detail.

Figure 28:
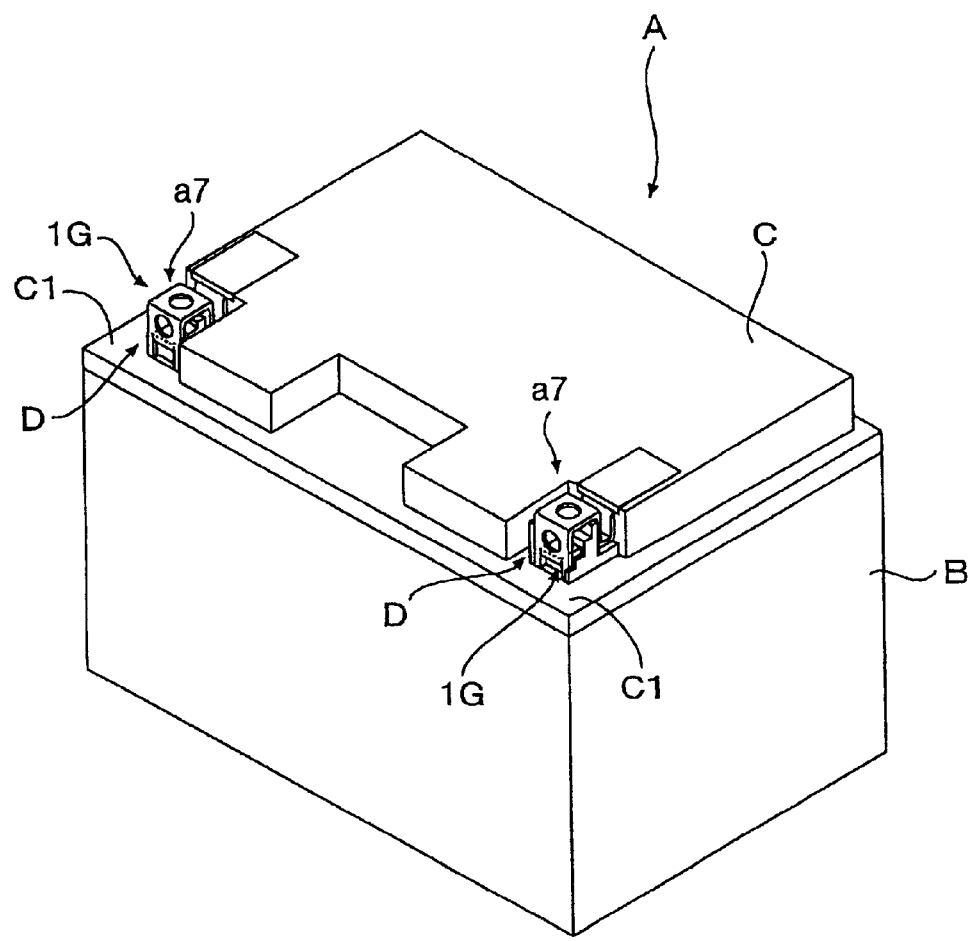
FIG. 28 is a perspective view of a storage battery which includes a terminal structure in still another example of performance of the present invention.

In the embodiment shown in FIG. 28–FIG. 31, FIG. 29 shows an exploded perspective view of the terminal structure a7 of the present invention in one positive or negative polarity shown in FIG. 28. The plate terminal 1G in the present invention is formed of an elongate rectangular metal plate of good conductivity, which is tough and elastic, which is about 2–2.5 mm thick and about 12 mm wide, and which is made of, for example, brass. One end plate portion 1a of the plate terminal 1G is formed with a circular hole 2 which is adapted to be snugly fit on a lead bushing E surrounding the electrode pole H. When the end plate portion 1*a* is snugly fit on the lead bushing E, the led-out plate portion 1*b* of the plate terminal 1G led out to the notch D of the cover C is made an L-shaped one 1*b* whose distal end side is vertically bent downwards. The horizontal plate portion 1*b*1 and vertical plate portion 1*b*2 of the led-outplate portion 1*b* are respectively provided with a bolt insertion hole 3 for top clamping and a bolt insertion hole 4 for front clamping, and nut accommodation spaces 5, 5 are respectively defined on the backsides of the horizontal plate portion 1*b*1 and vertical plate portion 1*b*2. Although the above construction does not differ from the construction of a plate terminal in the prior art, the plate terminal 1G in the present invention is provided with an engagement portion formed of an engagement-fixing plate portion 7" which is made in such a way that a free piece formed by cuts 6*a*, 6*a* provided in the lower plate portion 6 of the vertical plate portion 1*b*2 is bent inwards. In the illustrated example, the engagement-fixing plate portion 7" is such that the free piece is bent at a right angle to the lower plate portion 6, in other words, in a horizontal state, so as to protrude slightly, for example, about 0.5 mm, but the engagement-fixing plate portion 7" may well protrude in a somewhat upward state. The plate terminal 1G provided with the engagement-fixing plate portion 7" in this manner is pressed while being hit with a hammer or the like, into a snug fit hole of recessed groove shape 8 which is previously formed in the bottom face d1 of the notch D at the corner C1 of the cover C and which has dimensions adapted to pressedly insert the lower plate portion 6, until the engagement-fixing plate portion 7" is fixed to engage with the rear opposing wall face 8*b* of the snug fit hole 8. Thus, the terminal structure a7 of the present invention is constructed.

In general, the snug fit hole 8 is formed into a flat rectangular parallelepiped whose dimensions are so set that the rectangular opening thereof has a thickness (or height) and a width which are respectively substantially equal to the thickness and width of the lower plate portion 6, and a depth which permits the engagement-fixing plate portion 7" to be fixed in engagement with the rear opposing wall face 8*b* when the lower plate portion 6 has been pressedly inserted.

In pressing the lower plate portion 6 into the snug fit hole 8, it should preferably be pressedly inserted in a heated state. By way of example, the lower plate portion 6 is heated by a desired heater, or it is irradiated with ultrasonic waves.

Figure 29:
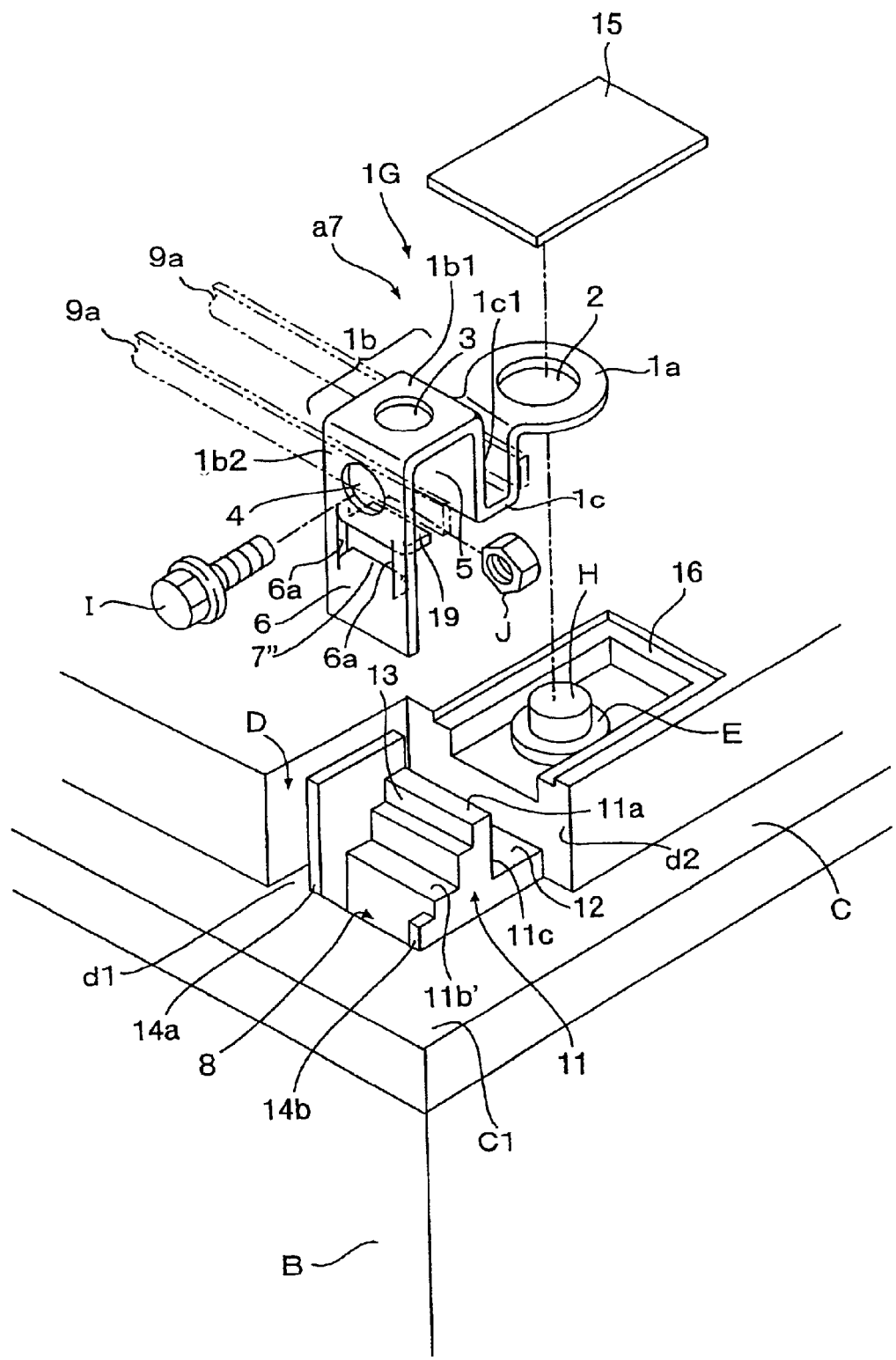
FIG. 29 is an exploded perspective view of the terminal structure in one polarity in FIG. 28.
Figure 30:
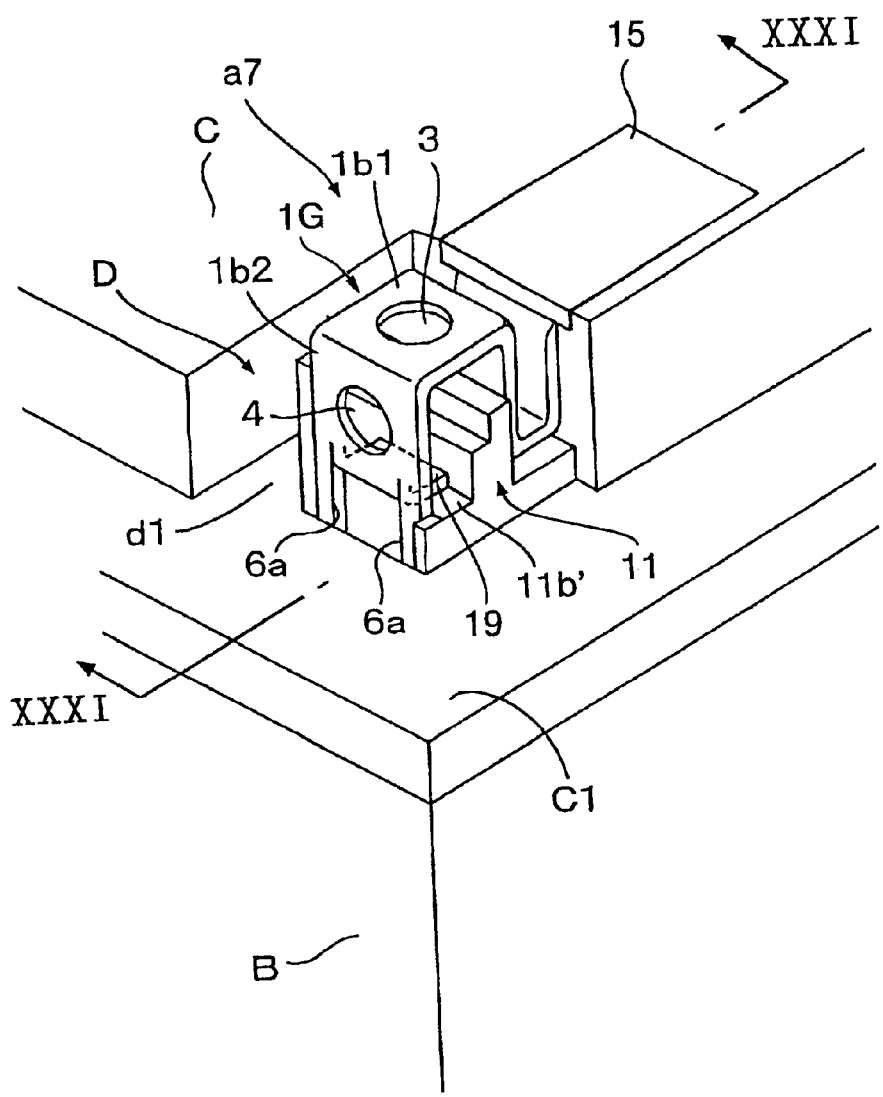
FIG. 30 is an assembled perspective view showing the assembled state of the terminal structure in FIG. 29.
Figure 31:
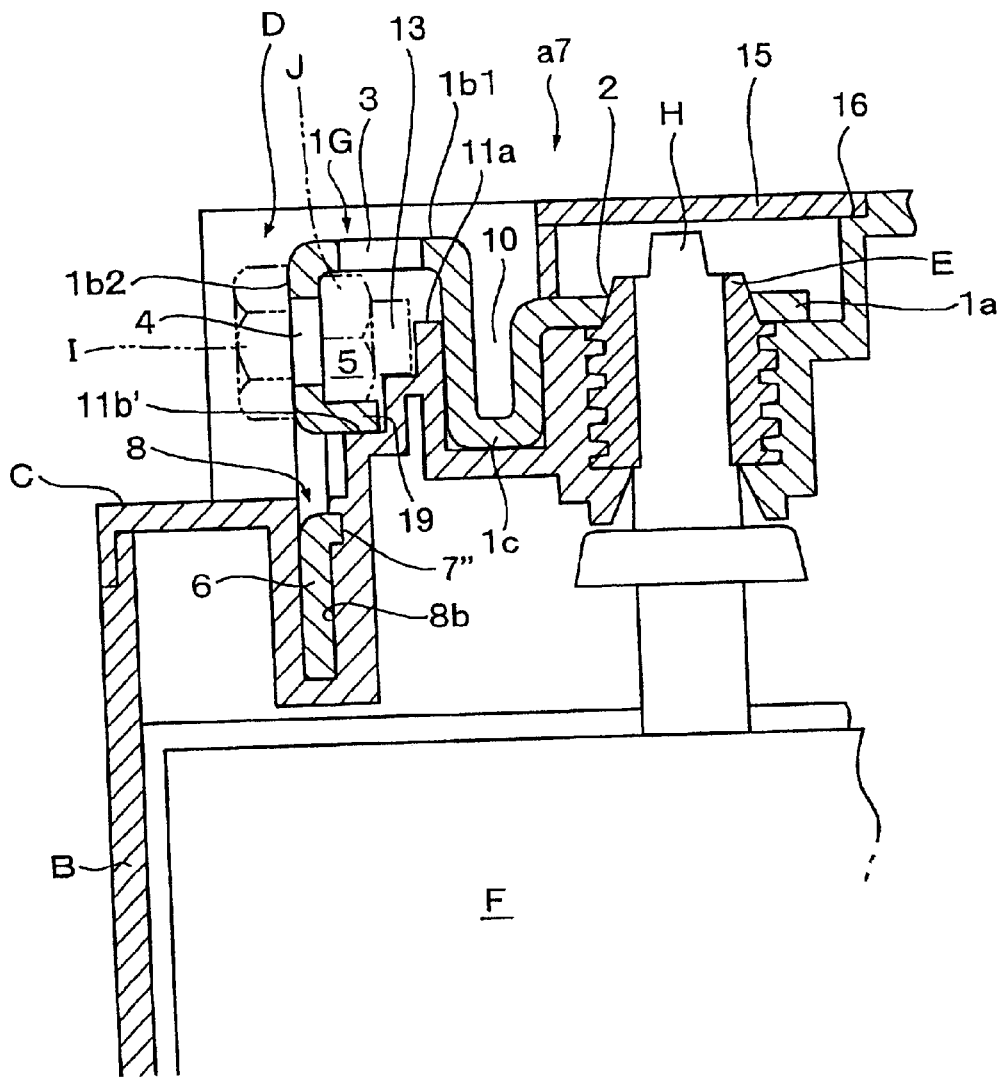
FIG. 31 is a sectional view taken along line XXXI—XXXI in FIG. 30.

In the illustrated embodiment, as shown in FIG. 29, the plate terminal 1G is grasped by a pair of grips 9*a*, 9*a* indicated by phantom lines, which are freely opened and shut and which are connected to an ultrasonic wave generator (not shown), and it is pressed into the snug fit hole 8 while being ultrasonically vibrated by the generator. In this case, the inner peripheral side wall faces of the snug fit hole 8 are softened by heat produced by the ultrasonic vibrations imparted to the lower plate portion 6. Therefore, not only the press-in operation is easily performed, but also the engagement-fixing plate portion 7" is rigidly fixed to engage in a state where it is embedded into the rear opposing wall face 8*b* of the snug fit hole 8 as shown in FIG. 31. Accordingly, the terminal structure a7 of the present invention being stable and stout against any external force is obtained. The ultrasonic vibrations bestow vertical vibrations of, for example, 20 kHz on the lower plate portion 6.

In this manner, according to the terminal structure a7 of the present invention, the plate terminal 1G has the lower plate portion 6 of its vertical plate portion 1*b*2 pressedly inserted into, and fixed in engagement with, the snug fit hole 8 in the top face of the cover C. Therefore, in a case where an external lead terminal (not shown) is clamped and bound to the plate terminal 1G by the top clamping or the front clamping with a bolt and a nut, the bolt I is inserted through the bolt insertion hole 3 provided in the horizontal plate portion 1*b*1 of the plate terminal 1G or the bolt insertion hole 4 provided in the vertical plate portion 1*b*2 thereof, and it is screwed into the nut J inserted in the corresponding nut accommodation space 5 on the backside of the horizontal or vertical plate portion. Even when the plate terminal 1G undergoes a large torque arising on this occasion, it is reliably prevented from turning in a horizontal direction, twisting, deforming, etc. Especially in the plate terminal 1G in the present invention, the engagement-fixing plate portion 7" unitarily protrudes from the lower plate portion 6 is fixed in engagement with the opposing wall face 8*b*. Therefore, the resistance of the plate terminal 1G against an upward external force is particularly increased to remarkably enhance the effect of preventing the plate terminal 1G from coming off. Accordingly, the terminal structure a7 which is very stable and stout is brought forth. A comparison test has revealed that, with the prior art wherein the lower end of the vertical plate portion of the plate terminal is horizontally bent inwards and snugly fit into the recessed groove provided in the lower front part of the terminal supporter in the notch of the cover, this lower end comes out of the recessed groove at a tightening force of 110 kgfcm in case of, for example, the top clamping, the plate terminal being twisted and deformed, whereas with the terminal structure a7 of the present invention, the plate terminal 1G is not deformed at all up to a tightening force of 180 kgfcm.

Further, according to the present invention, the lower plate portion 6 of the plate terminal 1G should preferably include, in addition to the engagement-fixing plate portion 7" which is provided by the rearward bending as stated above, a plurality of teeth or corrugations like arrowheads or saw teeth as are provided at each of both the side edges of the lower plate portion 6, or/and an engagement-fixing portion which is provided on at least one of the front and back faces of the lower plate portion 6. Thus, the terminal structure of a storage battery still further more stable and stout can be offered.

Figure 32:
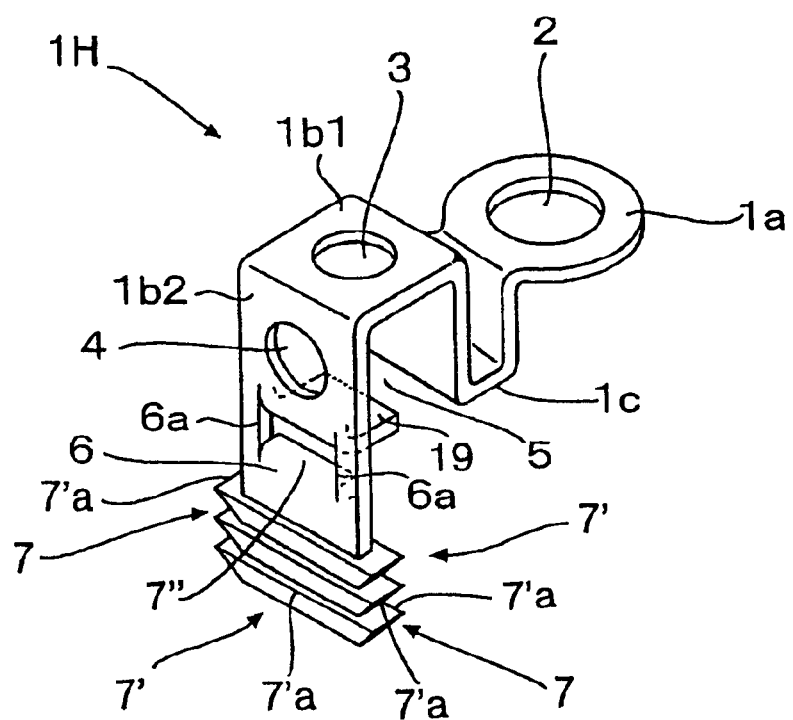
FIG. 32 is a perspective view of a plate terminal in a modified embodiment for use in the present invention.
Figure 33:
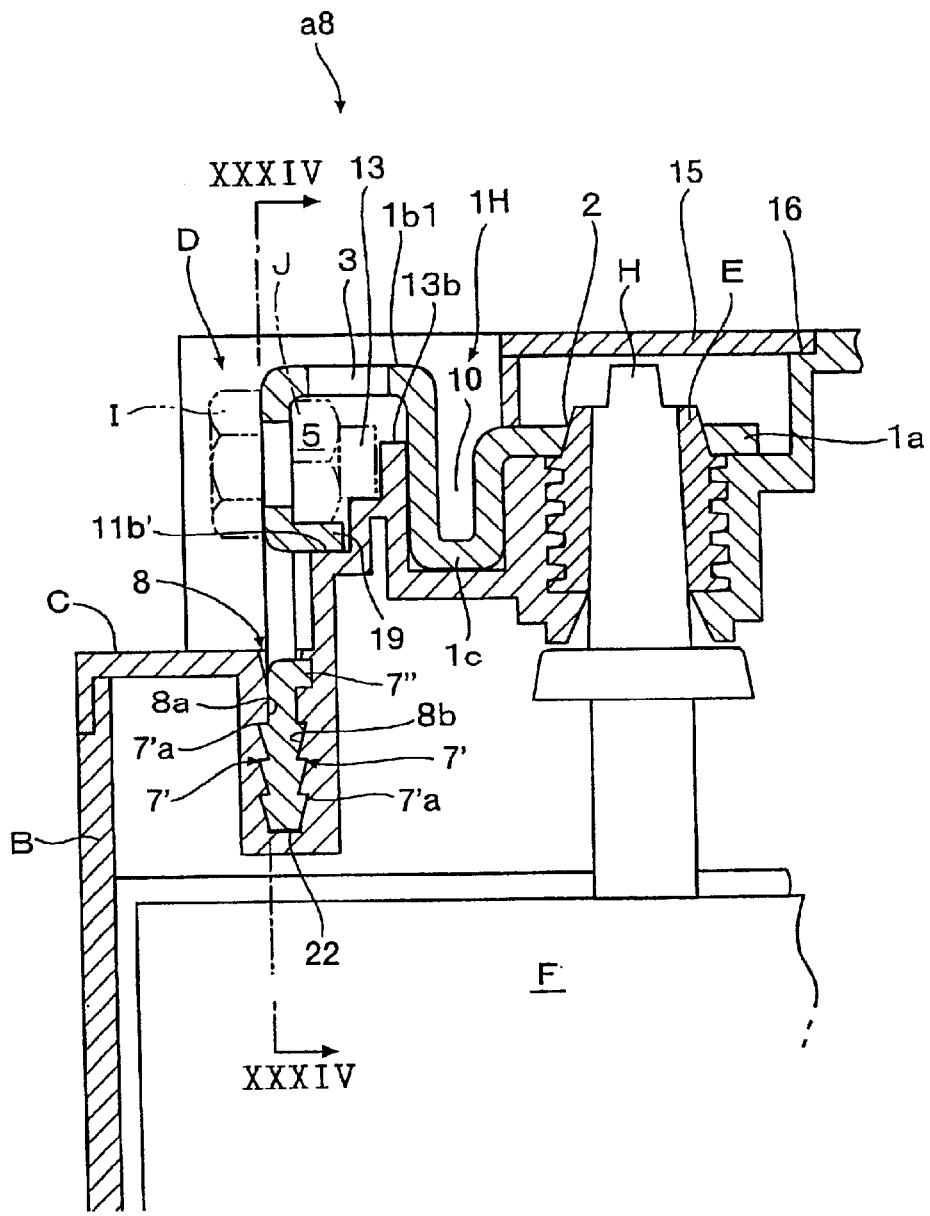
FIG. 33 is a sectional view of a terminal structure constructed using the plate terminal shown in FIG. 32, similar to FIG. 31.
Figure 34:
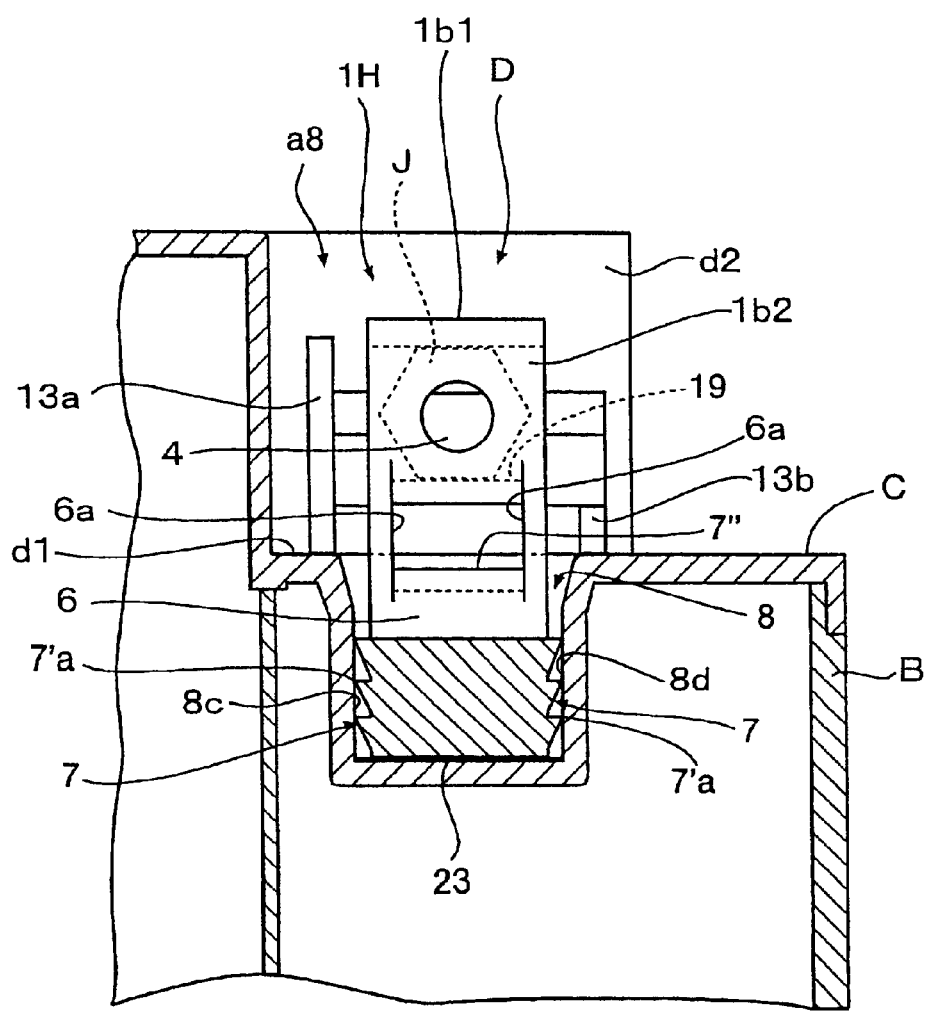
FIG. 34 is a sectional view taken along line XXXIV—XXXIV in FIG. 33.

An example of such preferable performance will be described with reference to FIG. 32 through FIG. 34. FIG. 32 is a perspective view of a plate terminal 1H in the example, FIG. 33 is a sectional view similar to FIG. 29, showing a preferable terminal structure a8 which is assembled in such a way that the plate terminal 1H is pressed into, and fixed to engage with, a similar snug fit hole provided in the bottom face of the notch of the cover of a storage battery, and FIG. 34 is a sectional view taken along line XXXIV–XXXIV in FIG. 33.

The plate terminal 1H is such that its lower plate portion 6 is provided with the same engagement portions 7', 7' as shown in FIG. 26, in addition to the engagement-fixing plate portion 7" explained before. More specifically, engagement-fixing protuberances 7'*a*, 7'*a*, 7'*a* which are unidirectional likewise to arrowheads or saw teeth are vertically arrayed in three stages at each of both the side edges of the lower plate portion 6, so as to form teeth or corrugations 7, and long engagement-fixing protuberances 7'*a*, 7'*a*, 7'*a* each of which extends over the full width of the lower plate portion 6 and which are unidirectional likewise to arrowheads or saw teeth are vertically arrayed in three stages on each of the front and back faces of the lower plate portion 6, whereby the engagement portion 7' consisting of the teeth or corrugations is formed as a whole. Of course, the engagement-fixing protuberances 7'*a*, 7'*a*, 7'*a* are not restricted to the tooth or corrugation shape, but small protuberances each of which is in the shape of a pyramid, a prism or the like and which protrude from the front and back faces of the lower plate portion 6 may well be regularly or irregularly disposed on the whole faces.

On the other hand, a snug fit hole 8 into which the lower plate portion 6 of the plate terminal 1H is pressed is previously formed as explained below. As shown in FIG. 33 and FIG. 34, the four inner peripheral wall faces of the snug fit hole 8 are tapered or inclined from the upper end face of the rectangular opening of this snug fit hole 8 to a suitable depth in order that the lower end part of the lower plate portion 6 may be easily inserted into the snug fit hole 8. As shown in FIG. 34, the widthwise dimension of the rectangular opening below the above depth is made smaller than (or substantially equal to) the width between the engagement-fixing protuberances 7'a, 7'a, 7'a and 7'a, 7'a, 7'a of the teeth 7, 7 provided at both the side edges of the lower plate portion 6. Also, as shown in FIG. 33, the heightwise dimension of the rectangular opening below the above depth is made smaller than the width between the engagement-fixing protuberances 7'a, 7'a, 7'a and 7'a, 7'a, 7'a of the engagement-fixing faces 7', 7 formed on the front and back faces of the lower plate portion 6. Accordingly, after the lower plate portion 6 has been pressedly inserted in a heated state, the engagement-fixing protuberances 7'a, 7'a, . . . of the engagement portions 7', 7' on the front and back faces thereof (or/and at both the side edges thereof) are fixed in engagement in a state where they are respectively embedded into the front and rear opposing wall faces 8a, 8b (or/and right and left opposing wall faces 8c, 8d) of the snug fit hole 8. Thus, when the lower plate portion 6 of the plate terminal 1H is pressedly inserted in the heated state, the four inner peripheral faces of the snug fit hole 8 are softened. As shown in FIG. 33 and FIG. 34, therefore, not only the engagement-fixing plate portion 7" formed in the lower plate portion 6 by bending is fixed to engage with the upper part of the rear opposing wall face 8b, but also the tooth-shaped engagement-fixing protuberances 7'a, 7'a, . . . of the engagement portions 7', 7' disposed on the front and back faces of the lower plate portion 6 are fixed to engage in the state where they are respectively embedded into the front and rear opposing wall faces 8a, 8b, and further, the engagement-fixing protuberances 7'a, 7'a, . . . of the engagement portions 7, 7 disposed at both the side edges of the lower plate portion 6 are rigidly fixed in engagement with the right and left opposing wall faces 8c, 8d. The terminal structure a8 of the storage battery in this state according to the present invention is very stable and stout against any external force. A comparison test has revealed that, in case of the front clamping, with the prior-art terminal structure, the plate terminal comes out of the recessed groove at a tightening force of 70 kgfcm, the plate terminal being twisted and deformed, whereas the plate terminal 1H of the terminal structure a8 of the present invention is not deformed up to a tightening force of about 160 kgfcm.

Besides, in pressing the plate terminal in the present invention into the snug fit hole, a small quantity of adhesive such as an epoxy resin may well be injected into the bottom part of the snug fit hole beforehand, followed by the pressed insertion of the plate terminal. Thus, at least the lower end of the plate terminal is bonded and fixed to the bottom face of the snug fit hole through the adhesive, whereby the fixing of the lower plate portion in engagement with the cover is intensified. As shown in FIG. 33 and FIG. 34, the above preferred embodiment corresponds to the case where the adhesive 22 is injected so as to fix the lower plate portion 6.

The terminal structure a8 obtained in this case is so stabler and stouter that the plate terminal 1H is not deformed up to a tightening force of about 180 kgfcm by the top clamping, and that it is not deformed up to the tightening force of about 160 kgfcm by the front clamping as stated above.

Incidentally, in the case where the engagement-fixing plate portion 7" is provided by bending the free portion formed by the cuts 6a, 6a in the lower plate portion 6 of the plate terminal, in accordance with the present invention, a nut receiver and turning stopper plate portion which horizontally protrudes by the rearward bending may well be simultaneously provided at a predetermined position over the engagement-fixing plate portion 7".

Besides, in order to prevent the lower end of the lower plate portion of a plate terminal from excessively pressing the bottom face of a snug fit hole in the pressed insertion of the plate terminal into the snug fit hole, a slight gap may well be held between the lower end and the bottom face when the plate terminal has been pressedly inserted a desired length.

In the foregoing embodiment, the engagement-fixing plate portion 7" and the nut receiver and turning stopper plate portion 19 are juxtaposed in the plate terminal 1G or 1H as shown in the figures. This juxtaposition is performed as explained below. An H-shaped cut is provided in the lower plate portion 6, and an upper free piece being comparatively long and a lower free piece being comparatively short, which are formed above and below, are respectively bent horizontally inwards at predetermined positions. As clearly shown in FIG. 31 or FIG. 33, the upper free piece is formed into the plate portion 19 whose upper face functions as the face for receiving the nut J and which functions as the nut turning stopper at the position where this plate portion 19 defines the nut accommodation space 5 adapted to hold the upper and lower flat faces of the nut J, jointly with the lower face of the horizontal plate portion 1b1 of the plate terminal 1G or 1H. On the other hand, the lower free piece is bent inwards as stated above, so as to form the engagement-fixing plate portion 7". Thus, in clamping and binding an external lead terminal (not shown) to the front of the plate terminal 1G or 1H, a bolt I is inserted through a bolt insertion hole 4 at the front, and it is wrenched into the nut J accommodated in the front nut accommodation space 5, so as to clamp the external terminal. The nut J does not sit idle during the bolting operation here, and the bolting operation can be performed smoothly and quickly.

FIG. 35 through FIG. 38 show a still further embodiment of the present invention.

Figure 35:
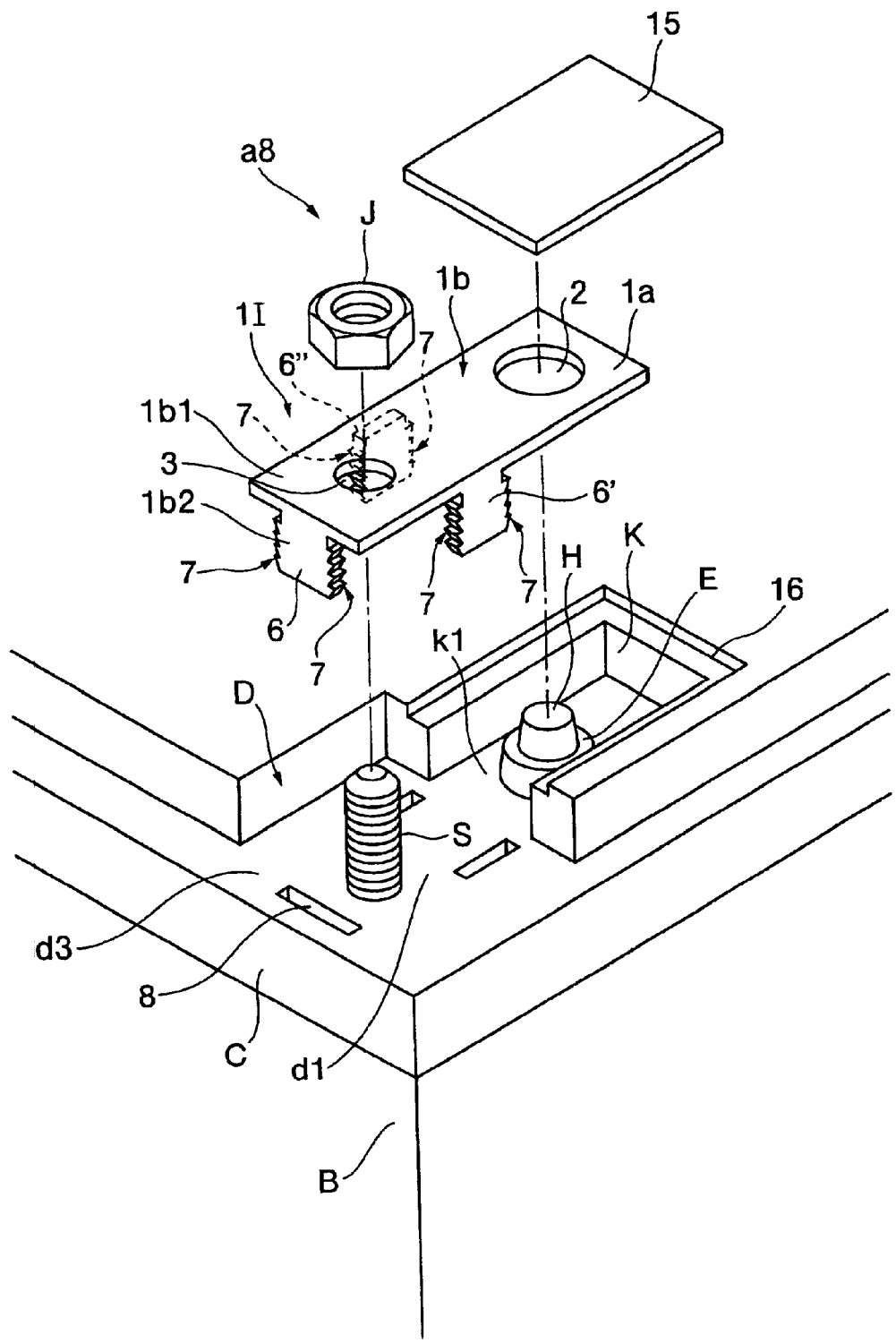
FIG. 35 is an exploded perspective view of the terminal structure of a storage battery in yet another example of performance of the present invention.
Figure 36:
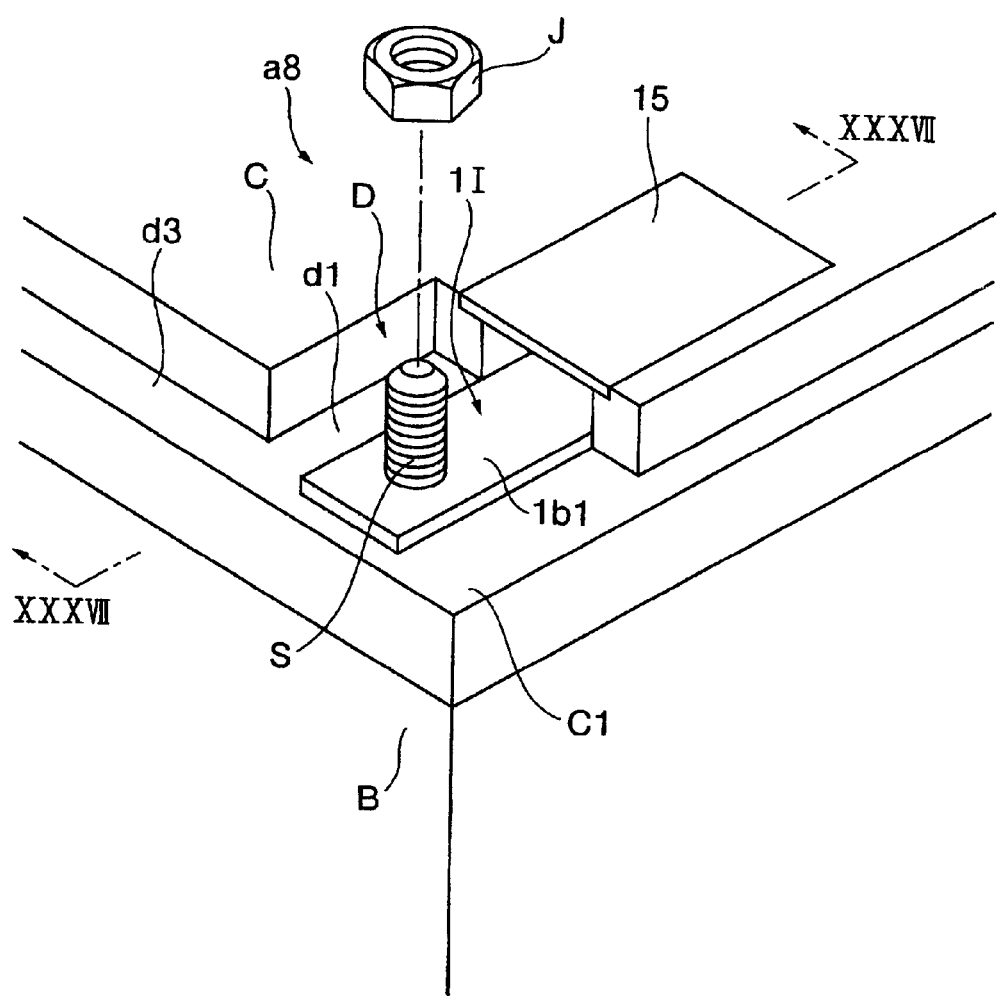
FIG. 36 is an assembled perspective view showing the assembled state of the terminal structure in FIG. 35.
Figure 37:
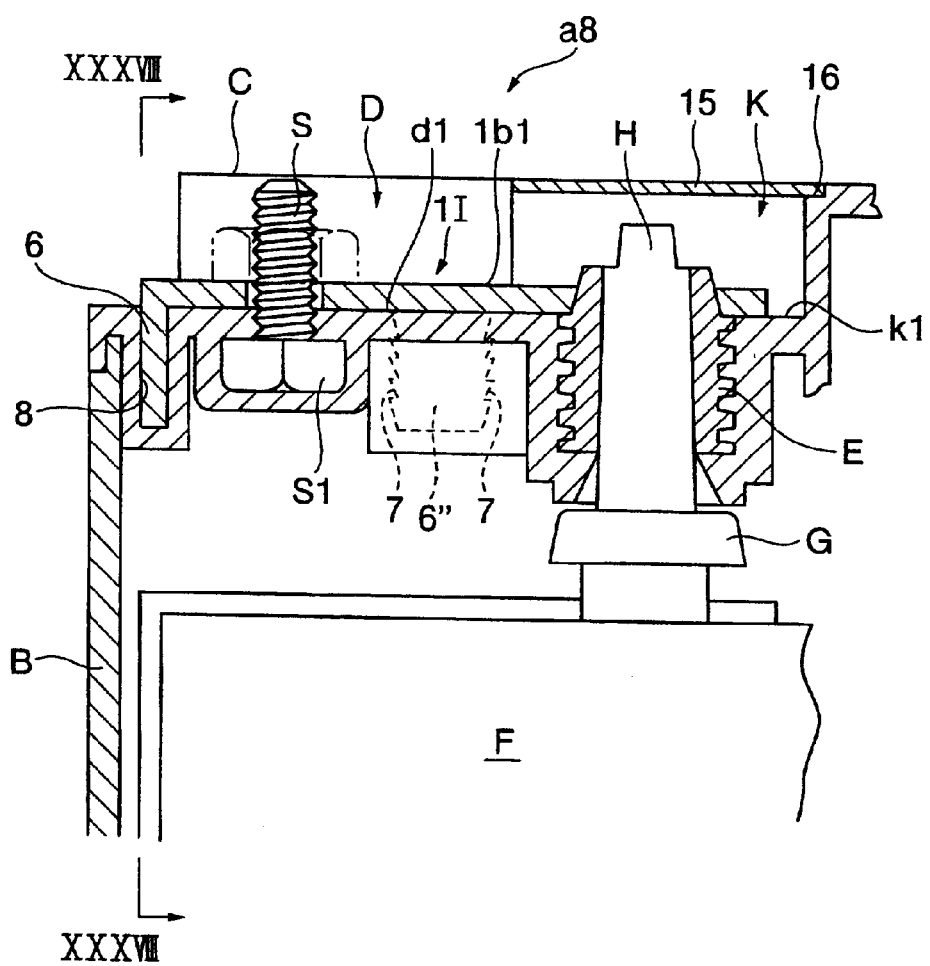
FIG. 37 is a sectional view taken along line XXXVII—XXXVII in FIG. 36.
Figure 38:
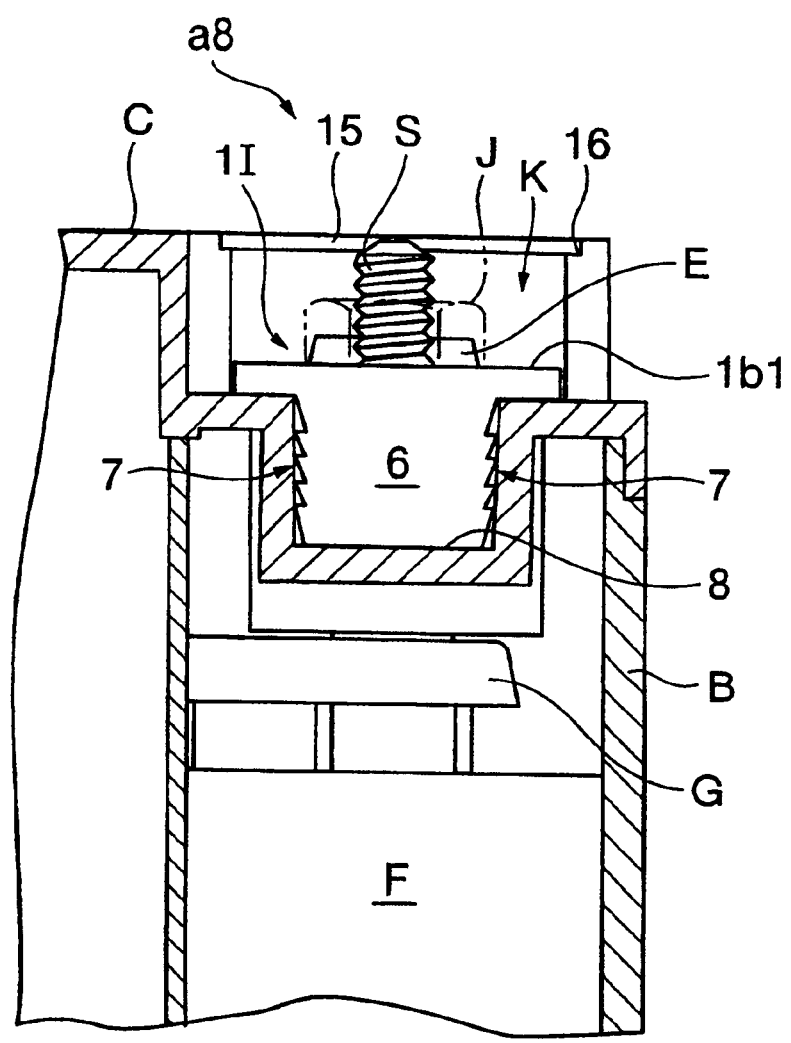
FIG. 38 is a sectional view taken along line XXXVIII—XXXVIII in FIG. 37.
Figure 39:
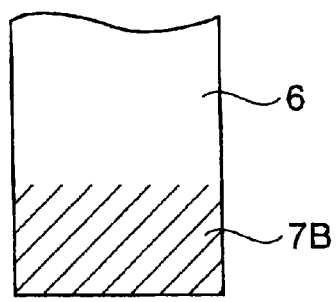
FIGS. 39A through 39D are views each showing a further example of an engagement portion which is provided on a lower plate portion.
Figure 39:
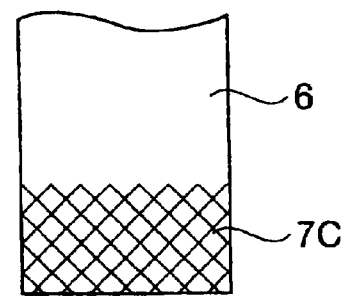
Figure 39:
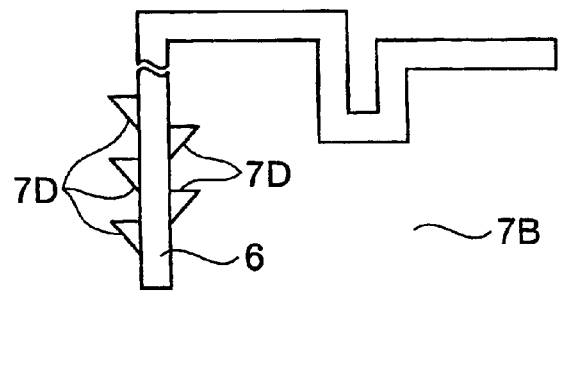
Figure 39:
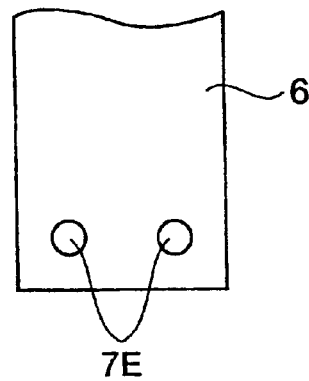

FIG. 35 is an exploded perspective view of a terminal structure a8 in one polarity of the lead acid battery body A stated before. FIG. 36 is a perspective view of the terminal structure in an assembled state. FIG. 37 is a sectional view taken along line XXXVII—XXXVII in FIG. 36, and FIG. 38 is a sectional view taken along line XXXVIII—XXXVIII in FIG. 37.

In this embodiment, reference sign 1I denotes a modification of a plate terminal. The plate terminal 1I is the same as in any of the foregoing embodiments in that one end plate portion 1a, which has a circular hole 2 adapted to snugly fit on a bushing E, is formed to be square, and that an L-shaped led-out plate portion 1b, which is led out from the end plate portion a1 onto the side of the notch D of a cover C, consists of a horizontal plate portion 1b1 and a vertical plate portion 1b2. However, the vertical plate portion 1b2 lacks in the bolt insertion hole 4 indicated in any of the foregoing embodiments, and it is generally formed of a lower plate portion 6 which is entirely pressed into a corresponding snug fit hole 8 formed in the cover C. The lower plate portion 6 is provided with teeth or corrugations 7, 7 as engagement portions at, for example, both the side edges thereof.

On the other hand, the bottom face d1 of the notch D of the cover C is formed into a flat one which is flush with the bottom face k1 of a U-shaped recessed space K surrounding the bushing E. In addition, a stud bolt S is planted in the bottom face d1 at a position which opposes a bolt insertion hole 3 provided in the horizontal plate portion 1b1 of the plate terminal 1I, and with a diameter at which the bolt insertion hole 3 is snugly fit on the stud bolt S. In assembling the plate terminal 1I onto the cover C, the bolt insertion hole 3 is snugly fit on the stud bolt S, and the circular hole 2 of the end plate portion 1a is snugly fit on the bushing E. Besides, the lower plate portion 6 is pressed into the snug fit hole 8 while the plate terminal 1I is being hit with a hammer. Alternatively, it is pressed into the snug fit hole 8 in such a way that the horn of an ultrasonic wave generator (not shown) is held to abute on the horizontal plate portion 1b of the plate terminal 1I, and that the horizontal plate portion 1b is irradiated with ultrasonic waves under pressure, so as to bring the inner wall faces of the snug fit hole 8 into a softened or melted state. The press-in operation is performed until the teeth 7, 7 at both the side edges of the lower plate portion 6 are fixed in engagement with the opposing wall faces of the snug fit hole 8. Thus, the stable and stout terminal structure 8a of the present invention is constructed.

In this manner, as clearly shown in FIG. 37, when the whole lower plate portion 6 of the plate terminal 1I has been pressedly inserted into the snug fit hole 8, the back face of the horizontal plate portion 1b1 is simultaneously held in abutment on the whole area extending from the bottom face k1 of the U-shaped recessed space K to the bottom face d1 of the notch D, and hence, the plate terminal 1I can be assembled into a very stable state. Incidentally, the width of the lower plate portion 6 may be either equal to that of the horizontal plate portion 1b1, or smaller than that of the horizontal plate portion 1b1 as best shown in FIG. 35.

The stud bolt S may well be planted into the bottom face d1 of the notch D of the cover C in such a way that a hexagonal or square recess is adapted to snugly secure the hexagonal or square head S1 of the stud bolt S and is formed in the cover bottom face d1, whereupon the head S1 is fitted into the recess directly or through an adhesive. It is common and favorable, however, that on the occasion of molding the cover C, the head S1 of the stud bolt S is disposed unitarily with the molded cover C as in the illustrate embodiment.

Besides, an external lead terminal (not shown) is connected to the plate terminal 1I in such a way that a ring at the distal end of the lead terminal is fitted on the stud bolt S, and that a nut J is threadably engaged with the stud bolt S from above the ring so as to clamp the ring. Even when the plate terminal 1I undergoes any external force ascribable to the threadable engagement, it is not twisted because the lower plate portion 6 is rigidly bound in the snug fit hole 8, so that rigid clamping is attained. Moreover, even when the lower plate portion 6 undergoes an upward external force during the service of the storage battery, or the like, it is stable and does not come off, and the terminal structure a8 obtained is stable and stout.

By the way, in the illustrated embodiment, the length of the horizontal plate portion 1b1 of the plate terminal 1I is made greater than in any of the foregoing embodiments, and the snug fit hole 8 into which the lower plate portion 6 forming the vertical plate portion 1b2 of the plate terminal 1I is pressedly inserted is provided in a cover face d3 which lies outside the bottom face d1 of the notch D.

Besides, the horizontal plate portion 1b1 of the plate terminal 1I should preferably be provided with at least one lower plate portion at the intermediate part thereof. In the illustrated embodiment, a pair of right and left lower plate portions 6', 6" which are suspended and bent at right angles are disposed at both the side edges of the intermediate part of the horizontal plate portion 1b1, and teeth or corrugations 7, 7 are provided at both the side edges of each of the lower plate portions 6', 6". On the other hand, right and left snug fit holes 8', 8" are provided in those positions of the bottom face d1 of the notch D of the cover C which correspond to the respective lower plate portions 6', 6". Thus, a terminal structure being more stout still further is brought forth by pressedly inserting the lower plate portions 6', 6" into the respectively corresponding snug fit holes 8', 8".

In any of all the foregoing embodiments, the plate terminal is sometimes pressed into the snug fit hole in such a way that the horn, grips or the like of the ultrasonic wave generator exerts/exert a pressure on the plate terminal while ultrasonically vibrating the plate terminal. It is assumed in this case that the pressure load has been suddenly increased upon the abutment of the plate terminal on the cover. In any of the illustrated embodiments, the pressure load of the plate terminal is suddenly increased at that moment, for example, the lower end of the lower plate portion 6 has abutted on the bottom face of the snug fit hole 8, the nut receiver and turning stopper horizontal plate portion 19 has abutted on the bearing face 11b of the cover C (refer to FIG. 13, FIG. 31 or FIG. 33), or the horizontal plate portion 1b1 has abutted on the cover faces k1, d1 (refer to FIG. 37). In an example of performance, the pressure load is increased to about 400 N by the abutment. The irradiation of the plate terminal with ultrasonic waves is stopped at that moment. On such an occasion, the engagement portions of the lower plate portion and the wall faces of the snug fit hole can be intensely fixed in engagement through the softening or melting of the wall faces. In order to more ensure the intense fixation in engagement, however, the irradiation with the ultrasonic waves should preferably be continued after the increase of the load for a short time, for example, about 50 ms. When the vibrations are continued in excess of about 50 ms under such a high load, evil influences such as the coming-off of the active material of the plate of the storage battery might be brought about, and hence, the time period of the irradiation after the load increase should preferably be confined within about 50 ms.

FIGS. 39A through 39D show several examples of aspects of engagement portions provided on lower plate portions, different from the engagement portions in the foregoing embodiments as shown in the figures. In the example shown in FIG. 39A, file or rasp teeth 7B are formed by providing a large number of parallel concave and convex stripes on the plate face of the lower plate portion 6. In the example shown in FIG. 39B, file or rasp meshes 7C are formed by providing a large number of crossing concave and convex stripes. In the example shown in FIG. 39C, triangular protuberances 7D are disposed zigzag on the front and back faces of the lower plate portion 6. In the example shown in FIG. 39D, at least one through hole (two through holes in the illustrated example) 7E is (are) provided in the lower plate portion 6. In the case where the plate terminal has its lower plate portion 6 pressed into the snug fit hole while being irradiated with ultrasonic waves, the melted resin of the wall faces of the snug fit hole enters the through hole 7E and then hardens, so that the through hole 7E brings forth the function of the engagement of the lower plate portion 6 with the wall faces.

What is claimed is:

1. In a terminal structure of a storage battery, wherein a plate terminal whose one end plate portion is connected to an electrode pole of the storage battery, and whose led-out plate portion led out from the electrode pole to a notch formed in a cover of the storage battery is formed into an L-shaped led-out plate portion vertically bent downwards and is provided with a bolt insertion hole, is mounted on a cover face, the improvement being that a lower plate portion of the vertical plate portion of said plate terminal is provided with an engagement portion, and said lower plate portion of said plate terminal is pressed into a fit hole provided in said cover face, so as to fix said engagement portion in engagement with an opposing face of said fit hole, wherein the engagement portion are teeth at both side edges of the lower plate portion of the vertical plate portion.

2. The terminal structure of the storage battery according to claim 1, wherein said engagement portion is formed of at least one member selected from the group consisting of a convex part, a concave part and a through hole in a desired shape.

3. In a terminal structure of a storage battery, wherein a plate terminal whose one end plate portion is connected to an electrode pole of the storage battery, and whose led-out plate portion led out from the electrode pole to a notch formed in a cover of the storage battery is formed into an L-shaped led-out plate portion vertically bent downwards and is provided with a bolt insertion hole, is mounted on a cover face, the improvement being that a lower plate portion of the vertical plate portion of said plate terminal is provided with an engagement portion, and said lower plate portion of said plate terminal is pressed into a fit hole provided in said cover face, so as to fix said engagement portion in engagement with an opposing face of said fit hole, wherein the plate terminal is so formed as to be provided with bolt insertion holes which are respectively provided in the horizontal plate portion and the vertical plate portion of the led-out plate portion and with nut accommodation spaces which are respectively defined on backsides of the horizontal plate portion and the vertical plate portion and is mounted on a bottom face of the notch of the cover, the improvement being that teeth are formed as the engagement portion at both side edges of a lower plate portion of said vertical plate portion, and said lower plate portion of said plate terminal is pressed into a fit hole provided in the bottom face of said notch, so as to fix said teeth at both the side edges in engagement with respectively opposing wall faces of said fit hole.

4. In the terminal structure of the storage battery according to claim 3, the improvement being that right and left bent plate portions are disposed which are bent in an L-shape rearwards from both sides of a lower plate portion of said vertical plate portion, teeth being provided as the engagement portion at rear end edges of said right and left bent plate portions, while rear right and left bent plate portions are disposed which are bent in an L-shape frontwards from both sides of a lower plate portion of a rear vertical plate portion that is formed behind and in opposition to the first-mentioned vertical plate portion by vertically bending a rear part of said horizontal plate portion downwards, teeth being provided as the engagement portion at front end edges of said rear right and left bent plate portions, and that said right and left bent plate portions of the front vertical plate portion and said rear right and left bent plate portions of said rear vertical plate portion are respectively pressed into front right and left fit holes and rear right and left fit holes provided in said bottom face of said notch of said cover, so as to fix the front right and left teeth and the rear right and left teeth in engagement with opposing inner wall faces of the respectively corresponding fit holes.

5. The terminal structure of the storage battery according to claim 4, wherein a nut receiver and turning stopper plate portion is formed under the bolt insertion hole of said front vertical plate portion of said plate terminal by bending part of said front vertical plate portion inwards.

6. In the terminal structure of the storage battery according to claim 3, the improvement being that an engagement-fixing face is provided as the engagement portion on at least one of front and back faces of a lower plate portion of said vertical plate portion, said engagement-fixing face including a plurality of engagement-fixing protuberances, and that said lower plate portion of said plate terminal is pressed into a fit hole provided in the bottom face of said notch, so as to fix said engagement-fixing protuberances of said engagement-fixing face in engagement with an opposing wall face of said fit hole.

7. The terminal structure of the storage battery according to claim 6, wherein teeth are provided at both side edges of said lower plate portion of said vertical plate portion, and they are fixed in engagement with opposing wall faces of said fit hole.

8. In the terminal structure of the storage battery according to claim 3, the improvement being that a lower plate portion of said vertical plate portion of said plate terminal is formed as the engagement portion with an engagement-stopping plate portion by bending inwards a free piece which is formed from cutting in said lower plate portion, and that said lower plate portion of said plate terminal is pressed into a fit hole provided in the bottom face of said notch of said cover, so as to fix said engagement-fixing plate portion in engagement with an opposing wall face of said fit hole.

9. The terminal structure of the storage battery according to claim 8, wherein at least one of front and back faces of said lower portion of said vertical plate portion is formed into an engagement-fixing face which includes engagement-fixing protuberances as an engagement portion, and which is located below said engagement-stopping plate portion.

10. The terminal structure of the storage battery according to either of claims 8 and 9, wherein teeth are further provided as the engagement portion at both side edges of said lower plate portion of said vertical plate portion.

11. The terminal structure of the storage battery according to any of claims 8 and 9, wherein the cutting is made in an H-shape in said lower plate portion under the bolt insertion hole provided in said vertical plate portion of said plate terminal, and the lower free piece is bent inwards into said engagement-fixing plate portion, while an upper free piece is bent inwards into a nut receiver and turning stopper horizontal plate portion.

12. The terminal structure of the storage battery according to any of claims 1 through 9, wherein said plate terminal includes threaded cylinders which are unitarily provided in the back faces of said horizontal plate portion and said vertical plate portion at positions registering with the corresponding bolt insertion holes, respectively.

13. The terminal structure of the storage battery according to any of claims 1 through 9, wherein a free plate portion is formed between two cuts which are provided at opposite ends of a lower end of said lower plate portion of said plate terminal, and a rectangular horizontal plate portion is provided as an engagement portion by bending said free plate portion inwards at a right angle.

14. In the terminal structure of the storage battery according to any of claims 1 through 9, the improvement being that said bolt insertion hole is provided in a horizontal plate portion of said L-shaped led-out plate portion, that said lower plate portion is provided with the engagement portion of desired shape, that said bolt insertion hole of said plate terminal is fitted on a stud bolt which is set upright on a bottom face of said notch of said cover, and that said lower plate portion is pressed into a fit hole provided in said cover, so as to fix said engagement portions in engagement with opposing wall faces of said fit hole.

15. The terminal structure of the storage battery according to claim 14, wherein at least one lower plate portion is provided at an intermediate part of said horizontal plate portion, while a fit hole corresponding to said lower plate portion of the intermediate part is provided in the bottom face of said notch of said cover, and that the intermediate lower plate portion is pressed into the corresponding fit hole so as to fix engagement portions provided in said intermediate lower plate portion, in engagement with opposing wall faces of said corresponding fit hole.

16. In a terminal structure of a storage battery, wherein a plate terminal whose one end plate portion is connected to an electrode pole of the storage battery, and whose led-out plate portion led out from the electrode pole to a notch formed in a cover of the storage battery is formed into an L-shaped led-out plate portion vertically bent downwards and is provided with a bolt insertion hole, is mounted on a cover face, the improvement being that a lower plate portion of the vertical plate portion of said plate terminal is provided with an engagement portion, and said lower plate portion of said plate terminal is pressed into a fit hole provided in said cover face, so as to fix said engagement portion in engagement with an opposing face of said fit hole, wherein said plate terminal has said lower plate portion pressed into said fit hole while being irradiated with ultrasonic waves simultaneously with application of a mechanical pressure to said plate terminal.

17. The terminal structure of the storage battery according to claim 16, wherein the irradiation with the ultrasonic waves is stopped when, in pressedly inserting said plate terminal, a pressure load has been suddenly increased by abutment of said plate terminal on said cover.

18. The terminal structure of the storage battery according to claim 16, wherein the irradiation with the ultrasonic waves is continued for a short time after, in pressedly inserting said plate terminal, a pressure load has been suddenly increased by abutment of said plate terminal on said cover.

19. The terminal structure of the storage battery according to any of claims 1 through 9 and claims 15 through 17, wherein the faces of said fit hole of said cover and said lower plate portion of said plate terminal pressed into said fit hole are bonded by an adhesive.

* * * * *